(12) United States Patent
Hoshino et al.

(10) Patent No.: US 7,520,615 B2
(45) Date of Patent: Apr. 21, 2009

(54) DISPLAY APPARATUS AND IMAGE PICKUP APPARATUS

(75) Inventors: Takeshi Hoshino, Kodaira (JP); Rieko Otsuka, Kokubunji (JP); Atsushi Ishibashi, Tokorozawa (JP); Youichi Horii, Mitaka (JP); Manabu Yanagimoto, Kawasaki (JP); Yukinobu Maruyama, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 500 days.

(21) Appl. No.: 11/410,960

(22) Filed: Apr. 26, 2006

(65) Prior Publication Data

US 2007/0064201 A1    Mar. 22, 2007

Related U.S. Application Data

(63) Continuation of application No. 10/928,196, filed on Aug. 30, 2004, now Pat. No. 7,059,729, which is a continuation-in-part of application No. 10/785,051, filed on Feb. 25, 2004, now Pat. No. 7,059,733.

(30) Foreign Application Priority Data

| Mar. 18, 2003 | (JP) | ............................. 2003-073371 |
| Feb. 5, 2004 | (JP) | ............................. 2004-028798 |
| Jun. 23, 2004 | (JP) | ............................. 2004-185173 |

(51) Int. Cl.
*G03B 21/26* (2006.01)
*G03B 21/28* (2006.01)
*G03B 21/56* (2006.01)
*G03B 21/60* (2006.01)
*G09G 5/00* (2006.01)
*H04N 9/31* (2006.01)

(52) U.S. Cl. .............................. 353/10; 353/37; 353/79; 353/99; 359/446; 359/458; 359/478; 345/653; 382/154; 348/744

(58) Field of Classification Search ..................... 353/7, 353/10, 37, 38, 46, 79, 94, 98, 99, 102, 122; 359/173, 174, 224, 236, 443, 446, 454–459, 359/462, 478, 850, 851; 345/4–6, 653, 664, 345/679; 348/739, 744; 382/154, 285, 289, 382/296, 297
See application file for complete search history.

(56) References Cited

U.S. PATENT DOCUMENTS 5,148,310 A  *  9/1992  Batchko ..................... 359/479

(Continued)

FOREIGN PATENT DOCUMENTS

JP          62-056930         9/1985

(Continued)

OTHER PUBLICATIONS

Japanese Office Action dated Oct. 17, 2006.
Japanese Office Action dated Oct. 24, 2006.
U.S. Appl. No. 10/785,051, filed Feb. 25, 2004, Hoshino et al.

*Primary Examiner*—Rochelle-Ann J Blackman
(74) *Attorney, Agent, or Firm*—Reed Smith LLP; Stanley P. Fisher, Esq.; Juan Carlos A. Marquez, Esq.

(57) ABSTRACT

A display apparatus is provided which can display different text/image information depending on the viewing angle and the viewer, display a high reality three-dimensional image viewable from any direction and realize stereoscopic viewing without glasses or the like. The display apparatus includes a display unit having a view angle-limiting filter on its surface, a rotary mechanism to rotate the display unit and a control unit which implements control so that when the display unit, rotated by the rotary mechanism, is faced to each of plural directions, the display unit displays a different text/image content associated with the direction.

6 Claims, 36 Drawing Sheets

U.S. PATENT DOCUMENTS

| | | | |
|---|---|---|---|
| 5,678,910 | A | 10/1997 | Martin |
| 5,695,346 | A | 12/1997 | Sekiguchi et al. |
| 5,754,147 | A * | 5/1998 | Tsao et al. ............ 345/6 |
| 6,208,318 | B1 | 3/2001 | Anderson et al. |
| 2002/0141636 | A1 * | 10/2002 | Wakamoto et al. ...... 382/154 |

FOREIGN PATENT DOCUMENTS

| | | |
|---|---|---|
| JP | 62-118289 | 11/1985 |
| JP | 62-217183 | 3/1986 |
| JP | 06-273693 | 3/1993 |
| JP | 6-301019 | 4/1993 |
| JP | 06-318058 | 4/1993 |
| JP | 10-117312 | 10/1996 |
| JP | 2001-133730 | 9/1997 |
| JP | 11-258697 | 3/1998 |
| JP | 11-327739 | 5/1998 |
| JP | 3054335 | 5/1998 |
| JP | 3058477 | 10/1998 |
| JP | 11-231794 | 11/1998 |
| JP | 2000-188746 | 12/1998 |
| JP | 2001-025036 | 7/1999 |
| JP | 2001-103515 | 9/1999 |
| JP | 2002-27504 | 7/2000 |
| JP | 2001-166259 | 9/2000 |
| JP | 2002-084553 | 9/2000 |
| JP | 2002-197044 | 3/2001 |
| JP | 2002-271820 | 3/2001 |
| JP | 2002-277823 | 3/2001 |
| JP | 2004-012644 | 6/2002 |
| WO | WO 92/02845 | 12/1990 |
| WO | WO 01/80204 A2 | 4/2001 |

* cited by examiner

FRESNEL LENS 20

21 LENTICULAR SHEET

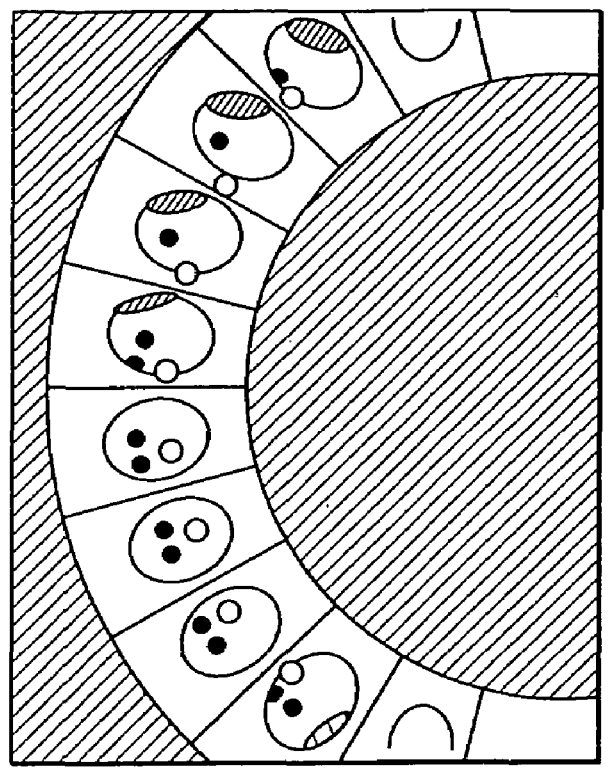
FIG. 29(a)
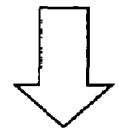
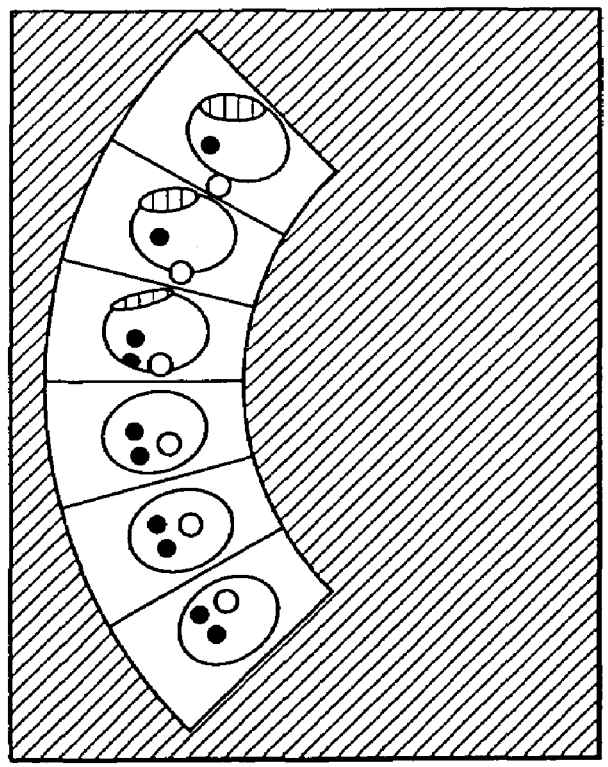
FIG. 29(b)

FIG. 38(a)
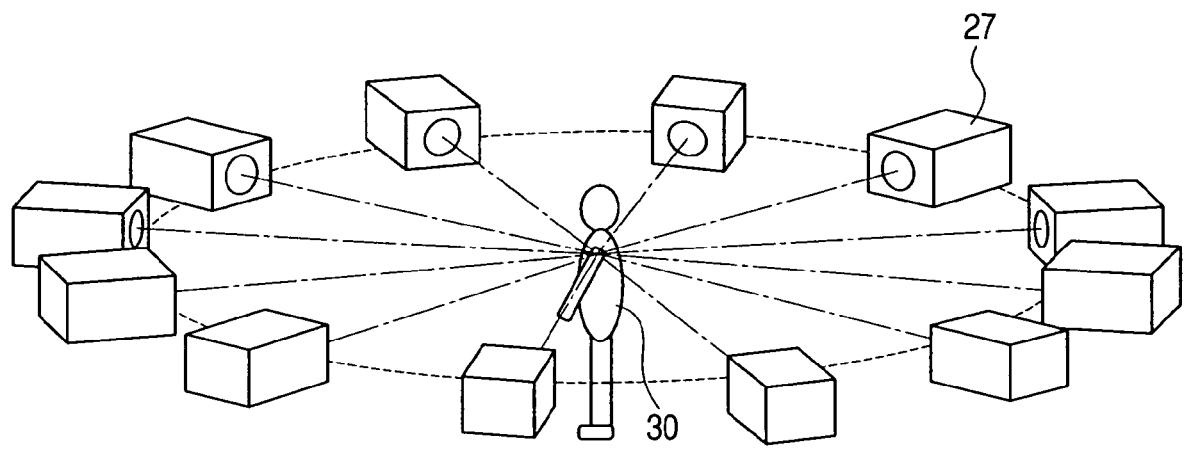
FIG. 38(b)
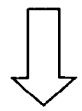
FIG. 38(c)
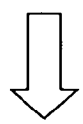
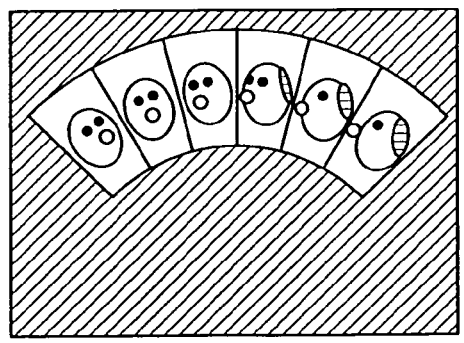

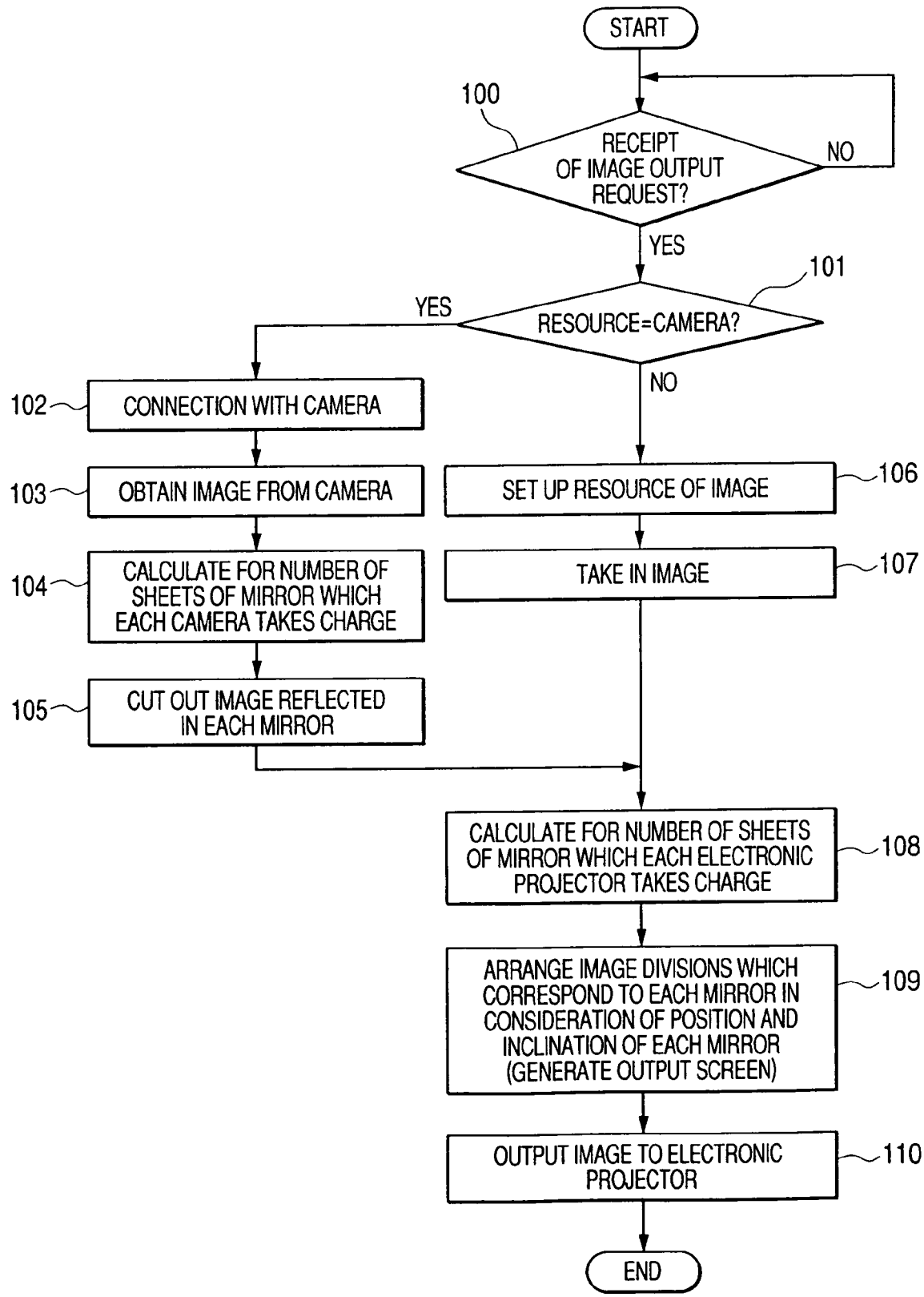

DISPLAY APPARATUS AND IMAGE PICKUP APPARATUS

CROSS REFERENCE TO RELATED APPLICATION

This application is a Continuation application of U.S. application Ser. No. 10/928,196 filed Aug. 30, 2004, now U.S. Pat. No. 7,059,729 which is a Continuation-In-Part of U.S. application Ser. No. 10/785,051 filed Feb. 25, 2004 now U.S. Pat. No. 7,059,733. Priority is claimed based on U.S. application Ser. No. 10/928,196 filed Aug. 30, 2004, which claims the priority date of U.S. application Ser. No. 10/785,051 filed Feb. 25, 2004, which claims the priority date of Japanese Patent Applications 2003-073371, 2004-028798 and 2004-185173, filed Mar. 18, 2003, Feb. 5, 2004 and Jun. 23, 2004, respectively, all of which is incorporated by reference.

BACKGROUND OF THE INVENTION

The present invention relates to a display apparatus and an image-pickup apparatus which enable a person to see different sides of a displayed object by viewing a displayed image while moving around it, and provide an image viewable as a three-dimensional image of the object.

A display apparatus has been proposed that displays three-dimensional images by using a rotary screen. In an example, this display apparatus produces a plurality of two-dimensional image data of a three-dimensional object as viewed from different directions around it, from three-dimensional image data representing the three-dimensional object (incidentally, in producing two-dimensional image data from three dimensional image data, a hidden-surface-erasure processing is applied in order to erase data for the unseen portions) and sequentially projects these two-dimensional image data on a rotating screen while sequentially changing the two-dimensional images projected on the screen according to the change of direction of the screen by rotation. According to this apparatus, when the screen is viewed from one position of the circumference, the image displayed on there changes gradually by rotating the screen quickly. Thus, by performing the image display, it is made visible the projected image of the screen as the three-dimensional image according to the visual afterimage effect. (e.g. refer to Japanese Patent Laid-open No. 2001-103515)

Additionally, in the case of the technology as described in Japanese Patent Laid-open No. 2001-103515, wherein three-dimensional image is obtained by projecting two dimensional images on a rotating screen, if the illumination distribution of the two-dimensional image to project is uniform, since illumination falls as it separates from an axis of rotation of the screen, an illumination distribution of the image projected on the screen becomes uneven. To prevent this problem, there is proposed e.g. in Japanese Patent Laid-open No. 2002-27504 a technology that makes the illumination distribution of two-dimensional image to project non-uniform, making the illumination distribution uniform for the images projected on the screen.

Another technology is presented in Japanese Patent Laid-open No. 2002-271820, wherein, an display apparatus has a configuration by which pictures of a display object are taken from different view points and slide images of such individual pictures are produced, and each time a rotating screen directs sequentially to those view points, the slide images obtained from the pictures taken at the corresponding view points are projected to the screen, and by increasing the rotational speed of the screen to 300-600 rpm, a pseudo three-dimensional image is formed on the screen by causing the naked eye afterimage. In another configuration, images of an object are serially taken by a camera moving circularly around the object, producing a cylindrical film of those images, and reading sequentially the images on the cylindrical film, then those images are imaged on a position of space through rotating mirror in synchronization with the reading of the cylindrical film, and by elevating the rotational speed high enough, a three-dimensional image floating in the space is obtained due to the naked eye afterimage.

SUMMARY OF THE INVENTION

The technologies described in above mentioned Japanese Patent Laid-open No. 2001-103515 and 2002-27504 enable a person to obtain three-dimensional view using afterimage, and therefore, it requires to display slightly different images nearly simultaneously. This necessitates great number of two-dimensional images, requiring great amount of time and labor to produce them, and also a memory storage of large capacity to store the two-dimensional image data. Further, because the screen must be rotated at a high speed, it is necessary to project to the screen with high accuracy two-dimensional images corresponding to the directions of the screen, which requires keeping the synchronization of screen rotation and the timing of projection of two-dimensional images onto the screen with high precision.

The technology described in above-mentioned Japan Patent Laid-open No. 2002-271820 also enables seeing a three dimensional image through the effect of naked eye afterimage by projecting two-dimensional slide images on to a screen rotating at a high speed, or by imaging two-dimensional images at a surrounding space position, such two-dimensional images being read from a cylindrical film through a mirror rotating at a high speed. With regard to projecting the slide images to the screen, as in the case of the technologies described in Japanese Patent Laid-open No. 2001-103515 and 2002-27504 mentioned above, it is required to project the corresponding slide images when the screen faces the view points mentioned above, and the screen being rotating at such a high speed that precision is required for the timing the slide images are projected to the screen.

In the technology described in Japan Patent Laid-open No. 2002-271820 mentioned above, for displaying a three-dimensional image using two-dimensional images read from the cylindrical film described above, an intricate means to read images sequentially from such a cylindrical film is required, and since these images read from the cylindrical film are imaged in a space, a clear three-dimensional image is visible only at this imaging point, making viewable position very limited.

In view of these problems, an object of the present invention is to provide a display apparatus and an image-pickup apparatus that enables a person to view clear three-dimensional images of high resolution from any direction without caring about the timing of the projection of two-dimensional images.

According to an aspect of the present invention, there is provided a display apparatus comprising: a screen which can rotate and provides a part for controlling the view angle; a mirror group which comprises a plurality of mirrors arrayed in a ring form or the like along a surface of a circular cone which sets a central axis as an axis pf rotation of the screen; and a plurality of electronic projectors arranged at positions where oppose to mirror faces of the mirrors comprising the mirror group and project different image divisions representing different sides of an object to the different mirror faces;

wherein each of electronic projectors is arranged set so as to project the image division to one predetermined mirror or a plurality of mirrors of the mirror group, and each of mirrors is arranged on optical path of optical system which the image division projected from the electronic projector is reflected on the mirror face and is projected to the screen.

In the above mentioned display apparatus, in a case that each of electronic projectors is arranged so as to project image division to the plurality of predetermined mirrors, inclination (angle) and position of each mirror are set up (adjusted) for each set by making into the set the plurality of mirrors which receive projection of the image division from the one electronic projector.

Further in the above mentioned display apparatus, inclination (angle) and position of the each mirror face to the surface of the circular cone are set up so that center of the image division is irradiated substantially at center of the each mirror face and light reflected at the center of the mirror face is projected to center of the screen.

According to another aspect of the present invention, the above mentioned display apparatus may have a further configuration wherein image-pickup devices can be provided by replacing the electronic projectors and an image-pickup object can be provided by replacing the screen so that the image divisions to be projected from the electronic projectors can be produced by picking up side-images of the image-pickup object through (by way of) the mirror group by the image-pickup devices.

According to yet another aspect of the present invention, the above mentioned display apparatus may have a further configuration wherein image-pickup devices can be provided same number as the electronic projectors and an image-pickup object can be provided by replacing the screen so that the image divisions to be projected from the electronic projectors can be produced by picking up side-images of the image-pickup object through (by way of) the mirror group by the image-pickup devices.

According to still another aspect of the present invention, the above mentioned display apparatus may further comprise an image-pickup apparatus comprising: an image-pickup object; the mirror group comprising of the plurality of mirrors arrayed in the ring form along the surface of the circular cone which sets the central axis as a center axis of the image-pickup object; and an image-pickup device which opposes to mirror faces of the mirrors comprising the mirror group and pick up different sides of the image-pickup object through (by way of) the mirror faces; wherein the image divisions to be projected by the electronic projectors are produced by acquiring the side images of the image-pickup object picked up by the image-pickup devices.

In the display apparatus mentioned above, number of image-pickup devices and number of electronic projectors may be different from each other and the image divisions for each electronic projector to project are produced by extracting different side images of the image-pickup object from images picked up by the image-pickup devices.

In the display apparatus mentioned above, number of image-pickup devices used may be greater than that of electronic projectors used, and resolution of the image-pickup devices used are lower than that of image-pickup devices obtained when number of image-pickup devices is the same as the electronic projectors.

In the display apparatus mentioned above, number of image-pickup devices used may be smaller than that of electronic projectors used, and resolution of the image-pickup devices used are higher than that of image-pickup devices obtained when number of image-pickup devices is the same as the electronic projectors.

Further in the display apparatus mentioned above, the image divisions projected by the electronic projectors may be produced by computer graphics.

According to an aspect of the present invention, there is provided an image-pickup apparatus comprising: an area for an image-pickup object where an image-pickup object is to be set up; a mirror group which comprises a plurality of mirrors arrayed in a ring form or the like along a surface of a circular cone which sets a central axis as a center of the area for the image-pickup object; and a plurality of image-pickup devices which opposes to mirror faces of the mirrors making up the mirror group and pick up side images of the image-pickup object viewed from each mirror; wherein each of the pickup devices is arranged on optical path of optical system so as to pick up side images of the image-pickup object as viewed from one or more predetermined mirror or mirrors of the mirror group, and each of mirrors is arranged on optical path of optical system which the side image of the image-pickup object is reflected on the mirror face of the mirror and is picked up by the image-pickup device.

In the above mentioned image-pickup apparatus, in a case that each of the image-pickup devices is arranged so as to pick up side images as viewed from the more predetermined mirrors of the mirror group, inclination (angle) and position of each mirror are set up (adjusted) by making into the set the plurality of mirrors which pick up by one image-pickup device.

In the above mentioned image-pickup apparatus, further comprising a unit which produces projection images as image divisions representing the side images of the image-pickup object viewed from the mirrors, from the images picked up by the image-pickup devices.

According to the present invention, it is not necessary to take care about the timing of the projection to the screen of each image division, and yet it is possible to obtain clear three-dimensional images of an improved resolution.

BRIEF DESCRIPTION OF THE DRAWINGS

FIGS. 29(a) and 29(b) are a diagram illustrating an example of the process of producing projection images to be used by the electronic projectors in FIG. 22 from the picked-up images by the image-pickup devices in FIG. 27;

FIGS. 38(a), 38(b) and 38(c) are a diagram conceptually illustrating a process of producing projection images in a sixth embodiment of the display apparatus according to the present invention; and FIG. 39 is a flowchart for the production process of projection images depending on the resources (supply source) of the projection images in a fifth or sixth embodiment of the display apparatus according to the present invention.

DETAILED DESCRIPTION OF THE PREFERRED EMBODIMENTS

Preferred embodiments of the present invention will be described with reference to the drawings.

Figure 1:
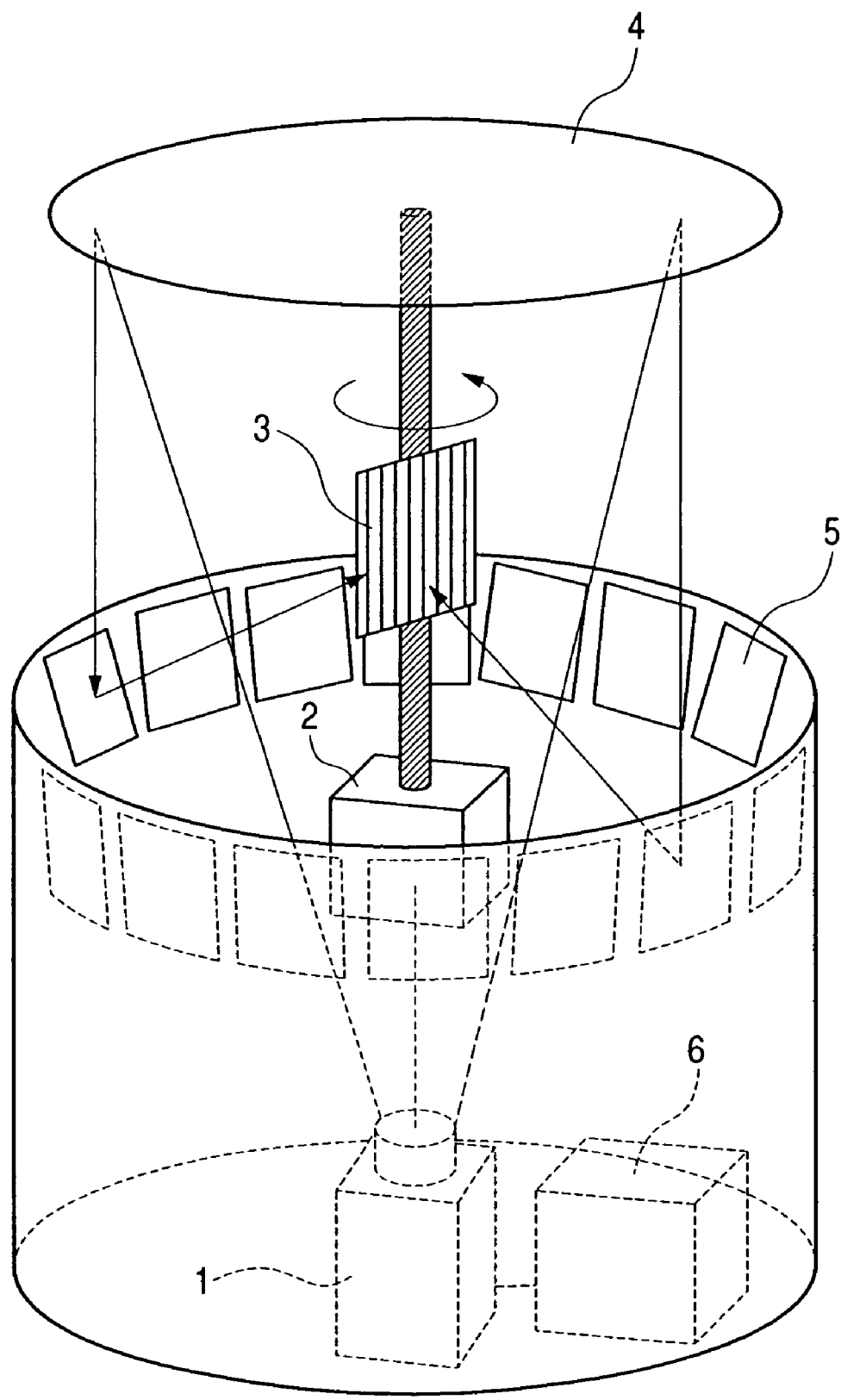
FIG. 1 is a perspective view showing a substantial configuration of a display apparatus according to a first embodiment of the present invention.

FIG. 1 is a perspective view of a display apparatus according to a first embodiment of the present invention. Reference numeral 1 is an electronic projector, 2 is a rotary mechanism (rotary drive source), 3 is a view-angle-limiting filter-attached screen, 4 is a mirror, 5 is a polyhedral mirror (mirror group), and 6 is a control unit.

With reference to this figure, the view-angle-limiting filter-attached screen 3 is rotated continuously or stepwise by the rotary mechanism 2. The polyhedral mirror 5 is a mirror group comprising of a plurality of mirrors arrayed on the surface of a circular cone forming a circular conical surface and in a ring form on the locus of a circle of a radius centered on the central axis of the circular cone, and the mirror 4 is attached to the inner side (under side) of the ceiling of the display apparatus. These polyhedral mirror 5 and mirror 4 form a projection optical system. The electronic projector 1 such as a liquid crystal projector, projects images of an object. An image from the electronic projector 1 is, after being reflected by each of mirror 4 and polyhedral mirror 5, projected to the view-angle-limiting filter-attached screen 3. The control unit 6 controls the rotary mechanism 2, and supply image data to the electronic projector 1.

Figure 2:
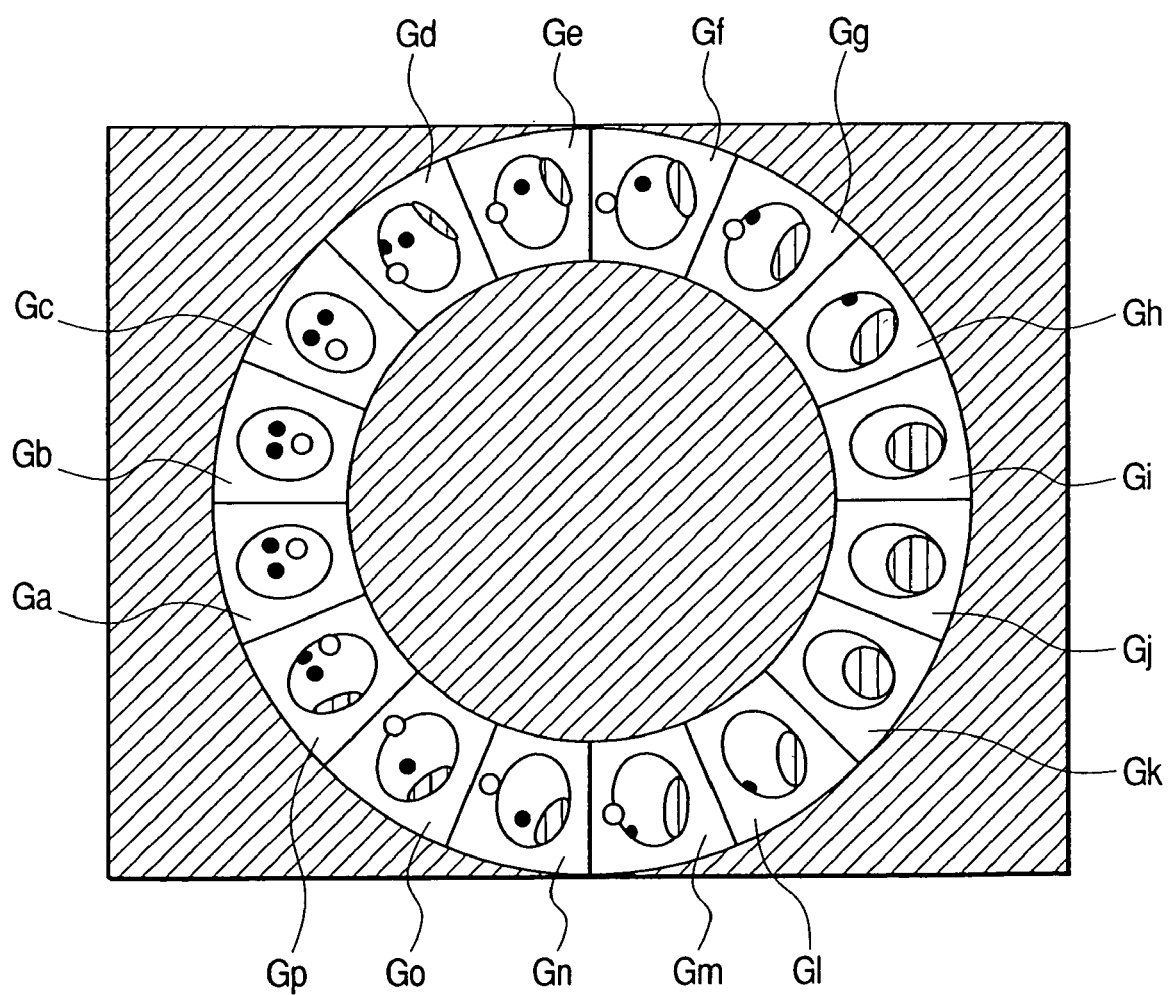
FIG. 2 is a diagram showing 16 image divisions projected to a rotating screen from an electronic projector.

FIG. 2 shows an example of the images that are projected to the projector 1, presenting a plurality of image divisions arrayed in a ring form. Each of image divisions Ga to Gp is an image of an object as viewed from different positions around it. For example, suppose the image division Ga is the image division of the object as viewed from the front, the image division Gp is the image of the same object as viewed from right behind, the location of these image divisions Ga to Gp in the projected images corresponding to the position the object is viewed from. These image divisions Ga to Gp are reflected by different mirrors of the polyhedral mirror 5 and projected to the view-angle-limiting filter-attached screen 3 respectively.

Figure 3:
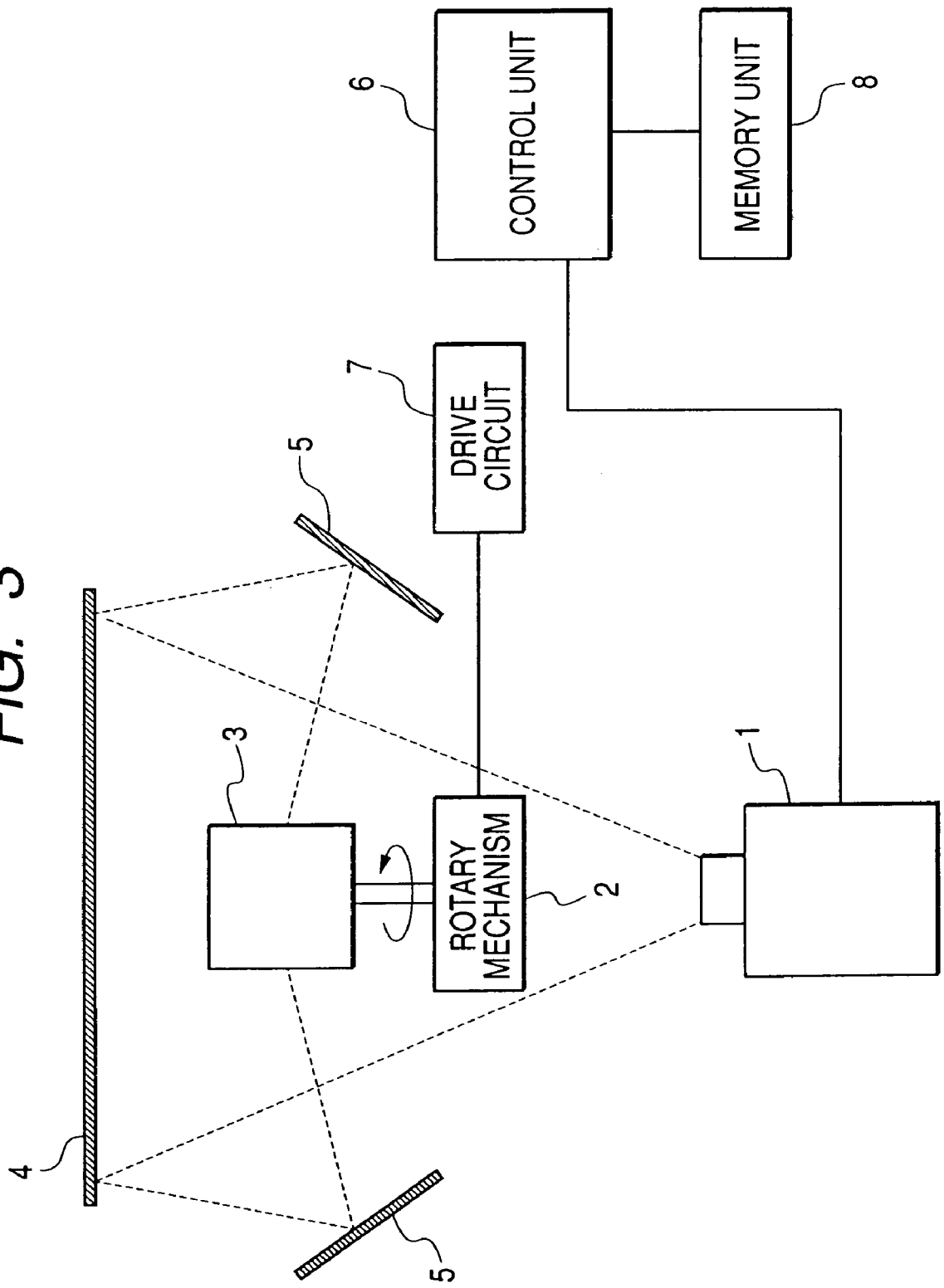
FIG. 3 is a general block diagram of the display apparatus of the first embodiment shown in FIG. 1.

FIG. 3 shows a total block diagram of the display apparatus of the first embodiment, wherein numerical reference 7 is a drive circuit, 8 is a memory unit and the other parts corresponding to those in FIG. 1 are given the same numerical references.

With reference to this figure, the memory unit 8 stores the image data representing the image divisions Ga to Gp as shown in FIG. 2. A control unit 6 drives a rotary mechanism 2 by controlling the drive circuit 7 so as to rotate a view-angle-limiting filter-attached screen 3. A control unit 6 reads out the image data from the memory unit 8 and feeds them to an electronic projector 1 so as to project the images as shown in FIG. 2. The projection images comprising of those image divisions Ga to Gp may either be produced freely by computer graphics or be produced through image-pickup by a CCD camera as described later. Further, when producing through image-pickup by a CCD camera, it is also possible to produce the data at a remote place and receive the image data thus produced from the remote place so as to store them in the memory unit 8.

Figure 4:
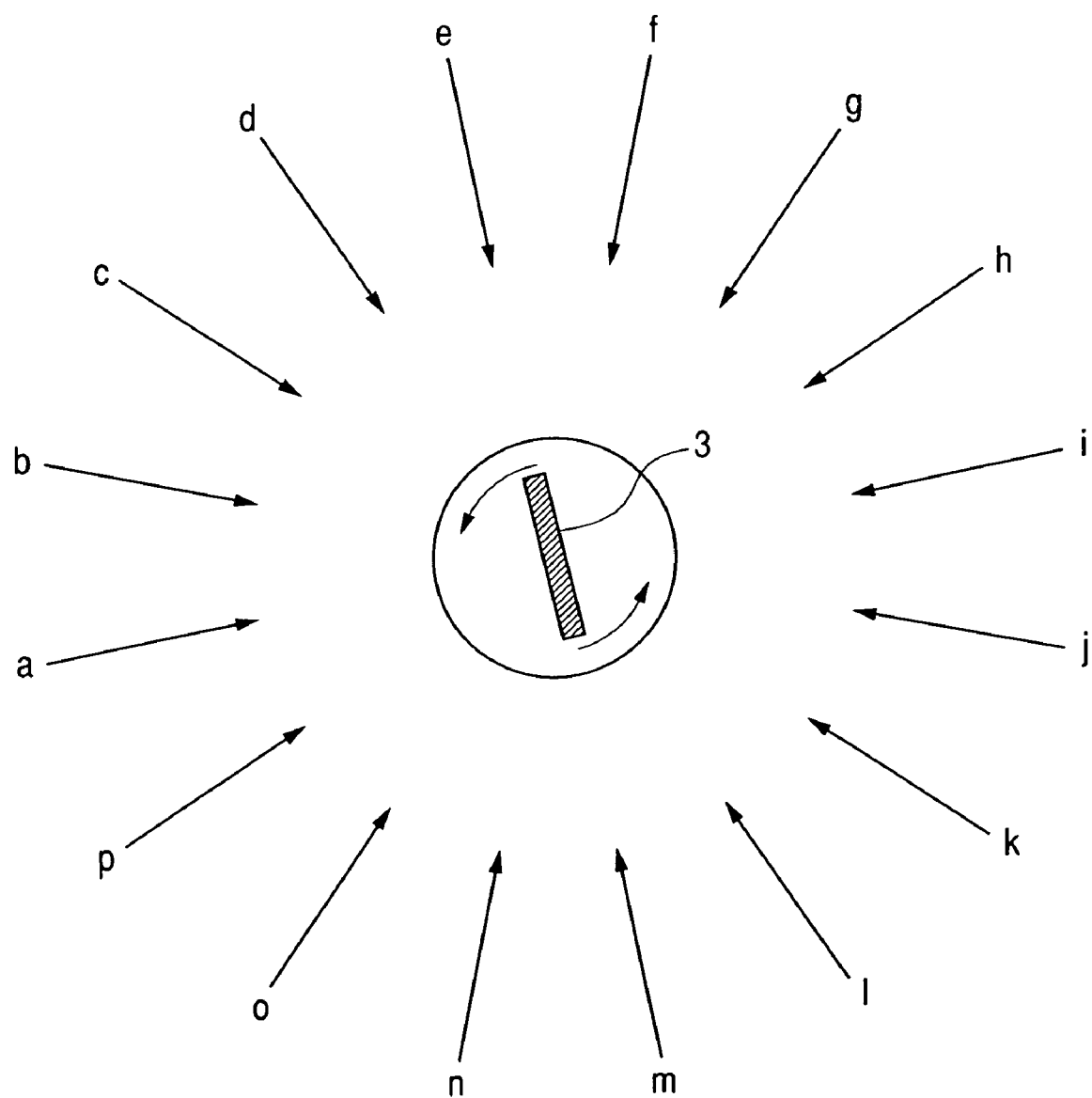
FIG. 4 is a diagram showing 16 directions a to p from around and to the rotating view-angle-limiting filter-attached screen in FIG. 1.
Figure 5:
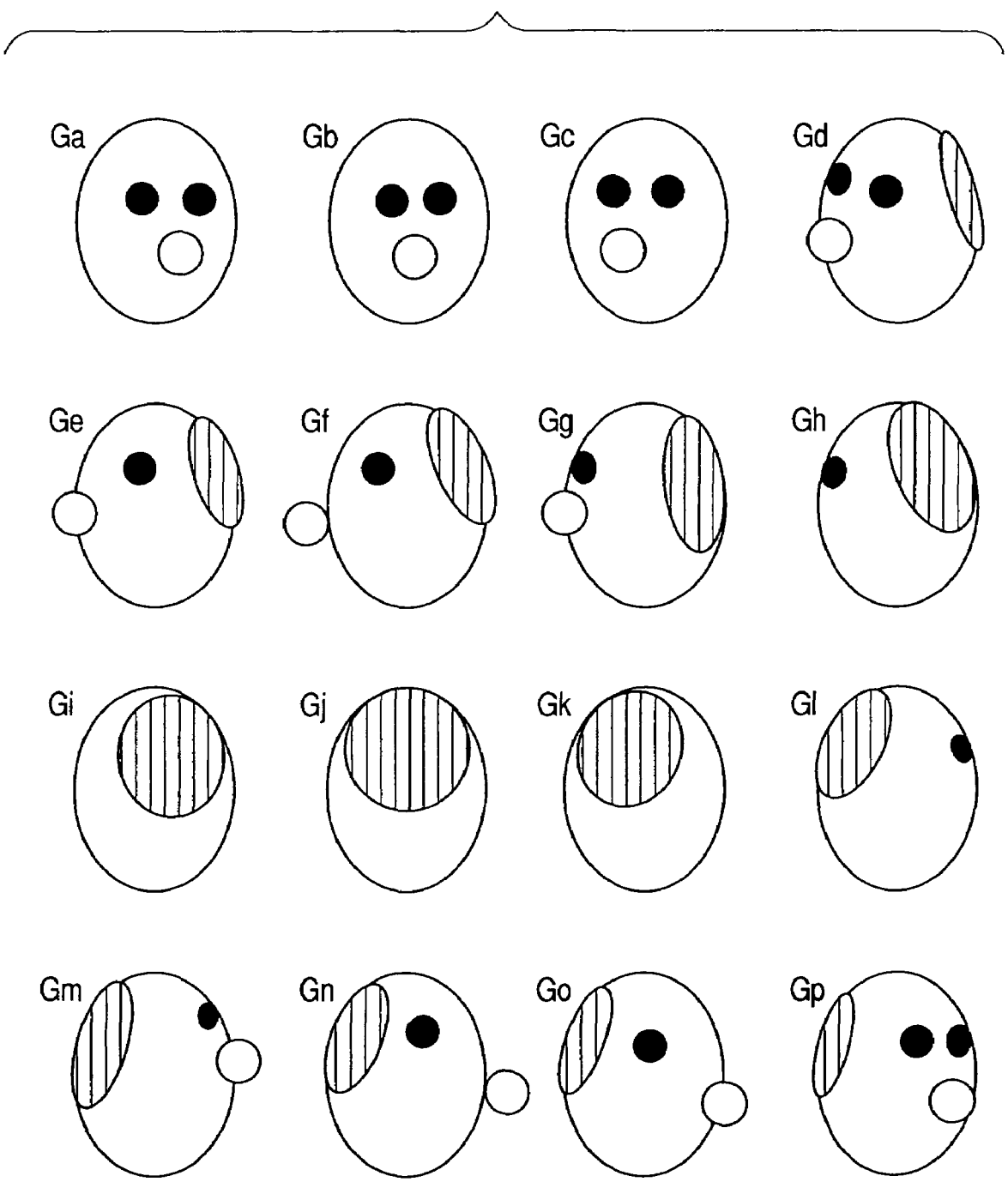
FIG. 5 is a diagram showing 16 image divisions Ga to Gp that constitutes a three-dimensional image viewed by a person who moves around the screen of a display apparatus according to the first embodiment of the present invention shown in FIG. 1.

By the configuration described above, the control unit 6 reads out image data from the memory unit 8 and sends them to the electronic projector 1. The electronic projector 1 projects the images as shown in FIG. 2 in accordance with the image data received. These projected images, after being reflected by mirror 4, then individual image divisions Ga to Gp being reflected by different mirror of polyhedral mirror 5, are projected to the view-angle-limiting filter-attached screen 3. By this, as shown in FIG. 4, wherein a through b are the positions to view the view-angle-limiting filter-attached screen 3 from around the view-angle-limiting filter-attached screen 3, from directions a to p, individual image divisions Ga through Gp are projected to the view-angle-limiting filter-attached screen 3. As a result, as shown in FIG. 5, corresponding to the direction to view the view-angle-limiting filter-attached screen 3 from the positions around it, different image divisions Ga to Gp are displayed on the view-angle-limiting filter-attached screen 3. In FIG. 5, the image divisions Ga to Gp are the images projected on the view-angle-limiting filter-attached screen 3 when viewed from the positions a through p in FIG. 4 respectively. For example, in the case the viewer views the view-angle-limiting filter-attached screen 3 from the direction a, when the face of the view-angle-limiting filter-attached screen 3 turns to the direction a, the image division Ga is displayed on the view-angle-limiting filter-attached screen 3 to be seen by the viewer.

Under this configuration, in the case the viewer continues viewing the view-angle-limiting filter-attached screen 3 from one direction (e.g. the direction a in FIG. 4), when the face of the view-angle-limiting filter-attached screen 3 turns to the direction a, the image division Ga is displayed on the view-angle-limiting filter-attached screen 3, enabling a viewer to see the image from the direction a. This means, the image division Ga is displayed once in one rotation of the view-angle-limiting filter-attached screen 3. Therefore, in order for the image division Ga, which is one side image of a three-dimensional image, to be seen as a continuous image without flickering, the rotational speed of the view-angle-limiting filter-attached screen 3 must be set so that the view-angle-limiting filter-attached screen 3 make one rotation to display the next cycle of the image division Ga when it is in the state of remaining in vision by the afterimage of an eye after a view of the image division Ga. This determines the lowest rotational speed of the view-angle-limiting filter-attached screen 3.

Figure 6A:
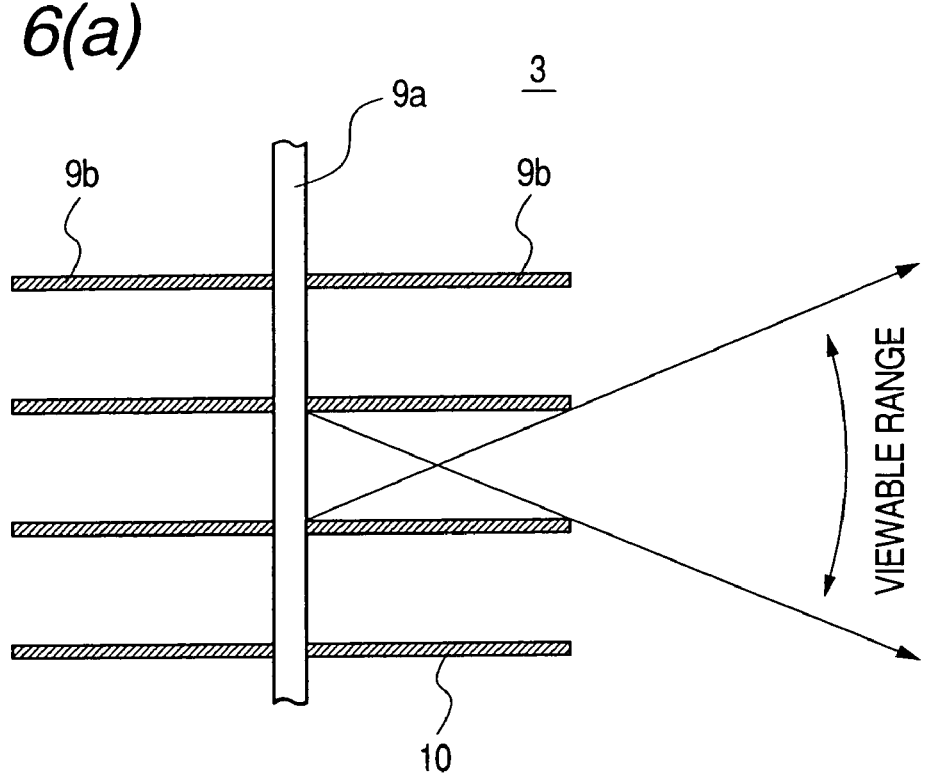
FIGS. 6(*a*) and 6(*b*) are a diagram for explaining an example of a view-angle-limiting filter-attached screen in FIG. 1.
Figure 6B:
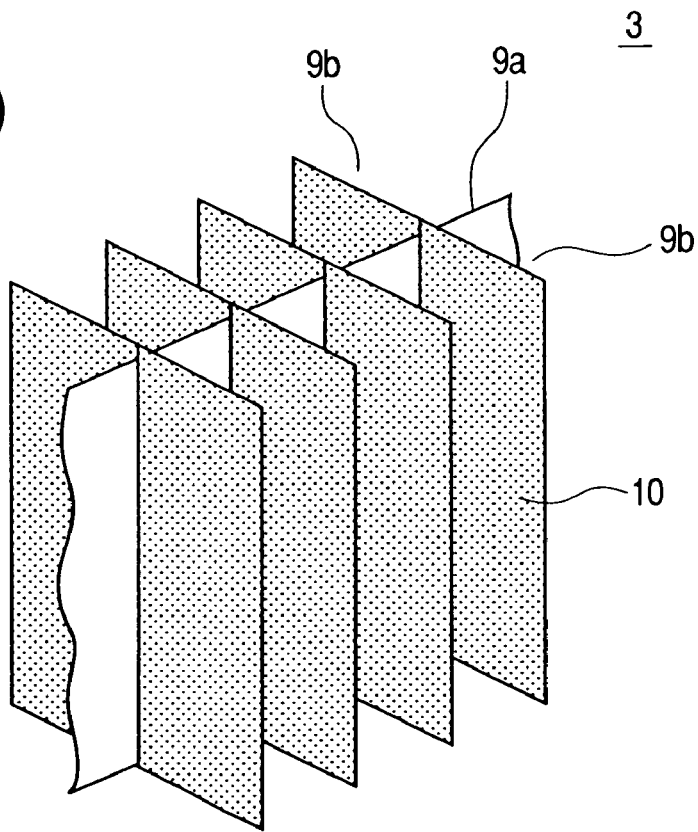

FIG. 6(*a*) shows a cross-sectional diagram of an example of the view-angle-limiting filter-attached screen 3 in FIG. 1, and FIG. 6(*b*) is a perspective view of the same, wherein 9*a* is a screen plate (a screen plate-like component), 9*b* is a view angle-limiting filter, 10 is a fin.

In FIGS. 6(*a*) and 6(*b*), the view-angle-limiting filter-attached screen 3 is configured as a screen plate 9*a* on both side of which the view angle-limiting filter 9*b* comprising of a plurality of shielding fins 10 are arrayed. These fins 10 are about 100 to 200 μm in thickness, and arranged with a pitch of about the pixel size in the view-angle-limiting filter-attached screen 3, e.g. 0.5 to 2 mm, so that, when the images as shown in FIG. 2 are projected, from whichever direction this view-angle-limiting filter-attached screen 3 is viewed, the image division projected by the next mirror of the polyhedral mirror 5 (the next image division) be shielded and only the image division projected by the mirror corresponding to the direction is to be seen.

The view angle-limiting filter 9*b* with fins 10 limits the view angle so as for the next image division not to be visible, wherein the height of the fin 10 is set depending on the maximum view angle (viewable range). Here, the maximum view angle should be about ±360 degree divided by 4 times the number of images around an object. For example, in the case where the number of image divisions of a projected image is 16 as shown in FIG. 2, the maximum view angle (viewable range) is about ±5.6 degree (=±360 degree divided by 16×4), and therefore, the height of the fin 10 is about 5 to 20 mm, and in the case of 10 image divisions, the maximum view angle should be about ±9.0 degree (=±360 degree divided by 10×4), making the height of the fin 10 about 3.2 to 13 mm.

Alternatively, the view-angle-limiting filter 9*b* may also be configured as about 50 to 200 μm thickness shielding dividers (not shown in the figure), which have the same function as the above-mentioned fins 10, are embedded with a pitch of about 0.3 to 2 mm in a transparent film or a transparent sheet (not shown in the figure) whose thickness is set to about 3 to 20 mm for a maximum view angle of about ±5.6 degrees (in the case of 16 image divisions) and about 1.9 to 13 mm for a maximum view angle ±9.0 degrees (in the case of 10 image divisions). The same function of the view-angle-limiting filter may also be implemented by an array of cylindrical lenses each of which converges light so as to limit the view angle.

Figure 7:
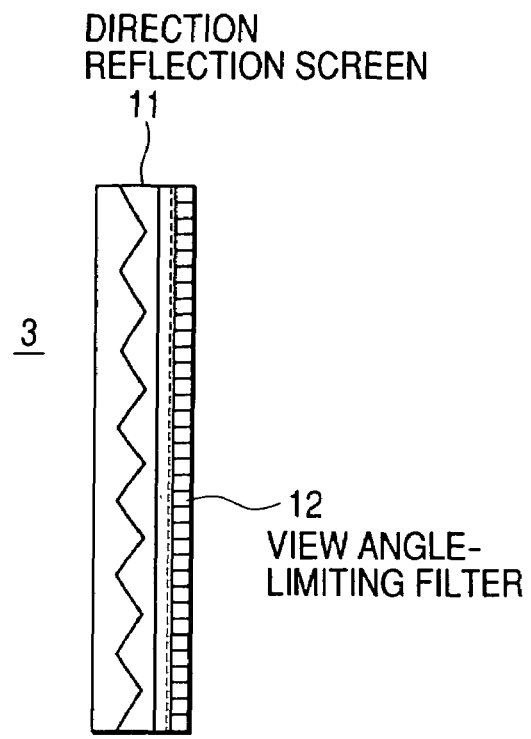
FIG. 7 is a block diagram showing another example of a view-angle-limiting filter-attached screen in FIG. 1.
Figure 8:
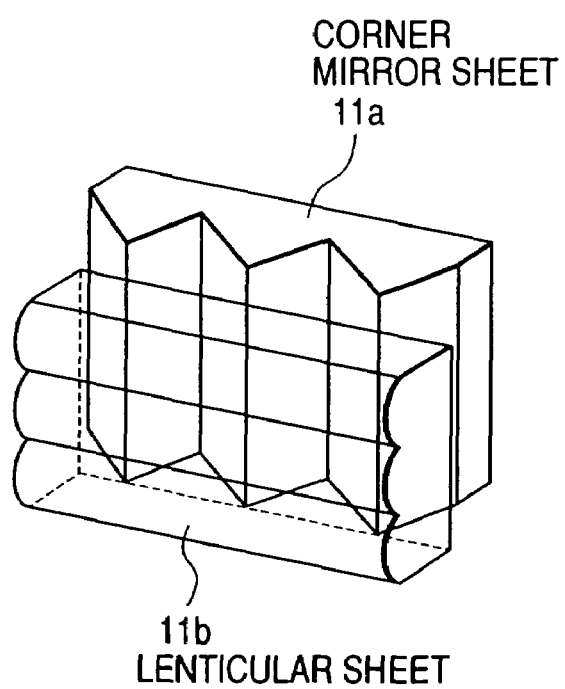
FIG. 8 is a perspective view showing an example of a directional reflection material screen in FIG. 7.

As another operative example of the view-angle-limiting filter-attached screen 3 in FIG. 1, a directional reflection screen material as described in Japanese Patent Laid-open No. 11-258697 may also be used. FIG. 7 shows a cross-sectional diagram of a view-angle-limiting filter-attached screen using such a directional reflection screen material, wherein reference numeral 11 is a directional reflection material screen and 12 is a view-angle-limiting filter. And FIG. 8 is a perspective view showing how the directional reflection material screen 11 in FIG. 7 is configured, wherein 11*a* is a corner mirror sheet and 11*b* is a lenticular sheet.

As seen in FIG. 7, this operative example is configured as a directional reflection material screen (a directional reflection screen) 11 fitted with a view-angle-limiting filter 12. The directional reflection material screen 11 is, as shown in FIG. 8, configured with a corner mirror sheet 11*a* and a lenticular sheet 11*b*. To incident light, the directional reflection material screen 11 shows horizontal retroreflection and vertical diffuse reflection. Incident light is reflected to the incident direction if the angle of incidence is not larger than ±45 degrees. That is, the viewer continues to view the same image until the directional reflection material screen 11 rotates ±45 degrees leftward or rightward after the screen is just faced to the viewer. Therefore, as compared with that shown in FIG. 6, the directional reflection material screen 11 reflects a larger amount of light due to the wider range of angles of incidence causing reflection to the viewer. As a result, the displayed image is brighter than that by the screen shown in FIG. 6.

Figure 9:
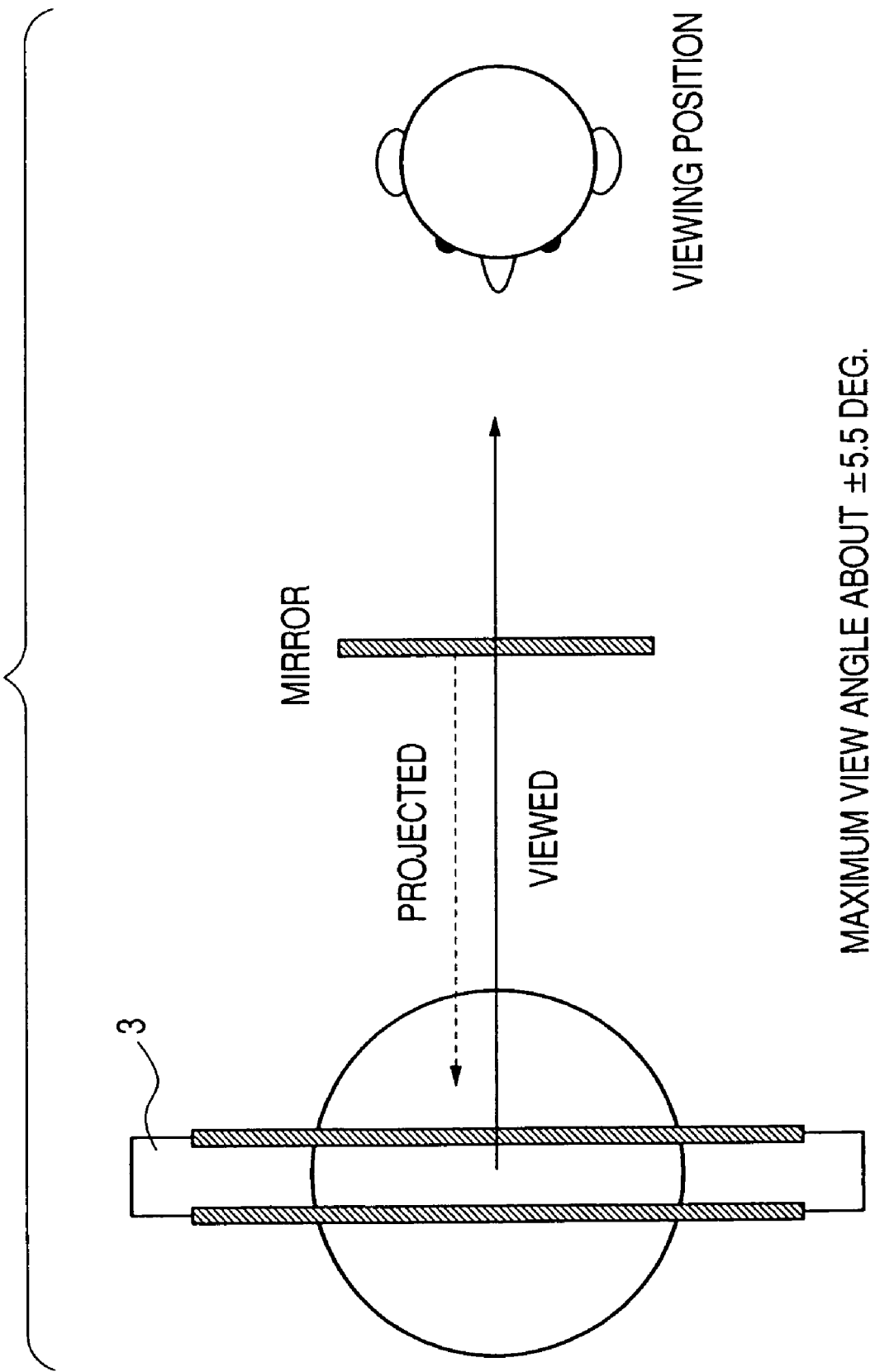
FIG. 9 is a diagram for explaining the maximum view angle.

However, with only the directional reflection material screen 11, since some of the incident light is reflected to other directions depending on the angle of incidence, depending on the viewing direction, the viewer may have an image overlap of image divisions from the plurality directions. Accordingly, a view-angle-liming filter 12 (shown in FIG. 7) is used to prevent the viewer from receiving reflected light from other directions so that the viewer views only the image division to be rendered to the direction of the viewer. Similar to the view-angle-limiting filter 9b shown in FIG. 6, this view-angle-limiting filter 12 is an array of fins arranged with a fine pitch. For example, if a view-angle-limiting filter (view-angle-limiting optical system) 12 that limits the view angle (viewable range) to ±24 degrees from the normal direction is attached to the surface of the directional reflection material screen 11, reflected light from adjacent image divisions can be shielded, allowing the viewer at one of a to p (shown in FIG. 4) to view only a single image division from the corresponding right direction as shown in FIG. 9. As a result, a viewer moving around the view-angle-limiting filter-attached screen 3 changing the viewing directions, a, b, c, - - -, p, can view from each viewing direction only the image division of an object, one of Ga to Gp (FIG. 5), that corresponds to such a viewing direction, which enables a plurality of viewers to view images of an object form any direction simultaneously. In addition, it is also possible to form a both-sided view-angle-limiting filter-attached screen 3 by bonding two directional reflection material screens 11 back to back, and attaching a view-angle-limiting filter 12 to the surface of each directional reflection material screens 11. When using the both-sided view-angle-limiting filter-attached screen 3, unlike a single-sided view-angle-limiting filter-attached screen 3, a viewer can view an image projected from the mirror of a direction twice in one rotation cycle of the screen, getting a brighter image.

Figure 10:
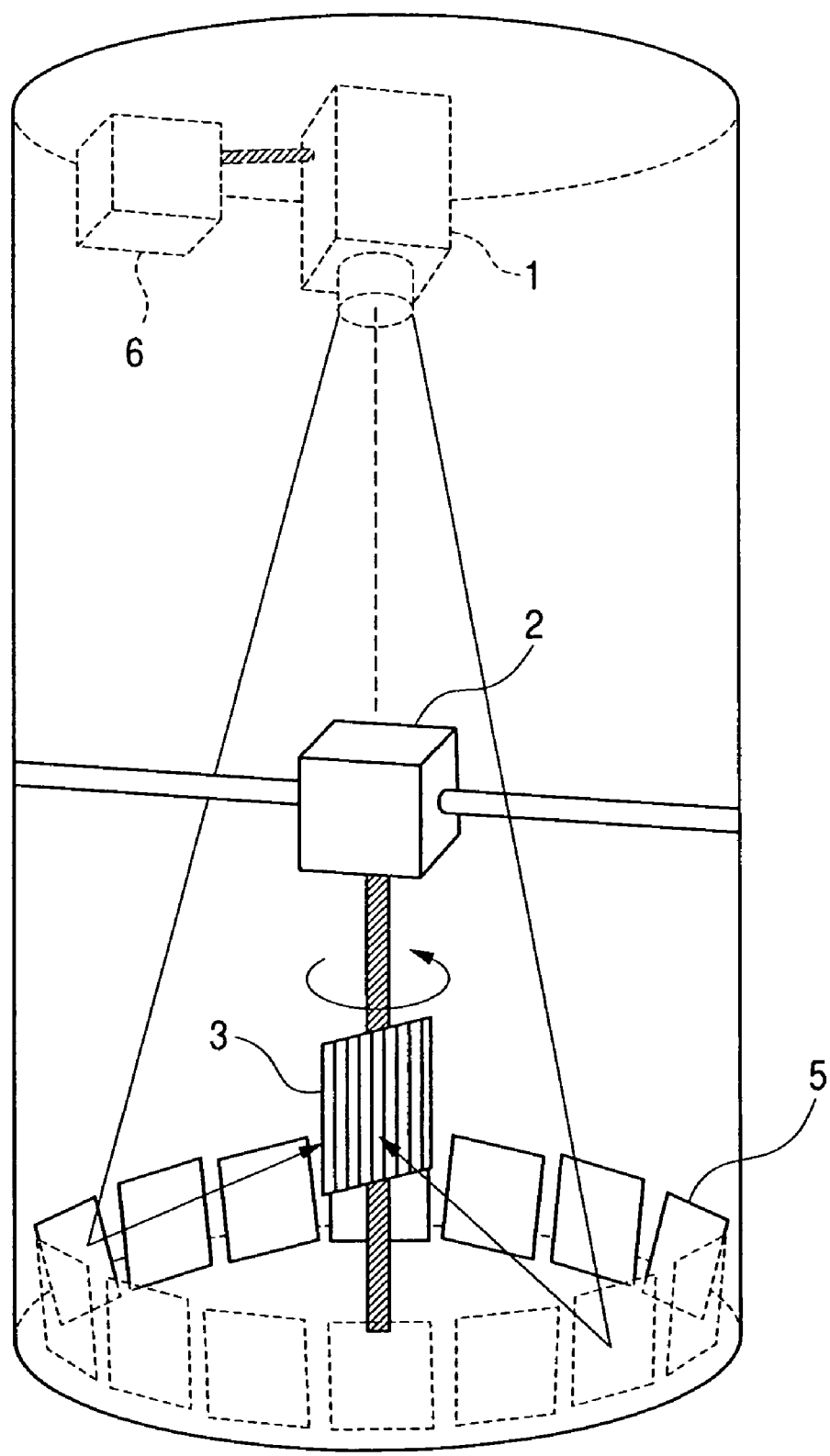
FIG. 10 is a perspective view of a modified example of the display apparatus according to the first embodiment of the present invention shown in FIG. 1.

FIG. 10 shows a variation of the display apparatus as the first embodiment illustrated in FIG. 1, wherein the parts corresponding to those in FIG. 1 are marked with the same reference numerals and explanations are not repeated. In this figure for the variation, an electronic projector 1 is fixed to the ceiling and the rotary mechanism 2 and a view-angle-limiting filter-attached screen 3 are set up vertically below the electronic projector 1. Images projected from the electronic projector 1 are reflected by the polyhedral mirror 5 on the circular conical surface and projected to the rotating view-angle-limiting filter-attached screen 3 from directions a to p as shown in FIG. 4. Thus, at the view-angle-limiting filter-attached screen 3, such image divisions Ga to Gp as shown in FIG. 5 are displayed in accordance with the direction (that is viewing direction).

As described above, a display apparatus according to the first embodiment of the present invention allows more than one persons to simultaneously enjoy a three-dimensional image from any direction, needs no adjustment of each mirror of polyhedral mirror 5, and reduces errors due to subtle deviations of the position or direction of the mirrors. In addition, since the polyhedral mirror 5 can be set up close to the view-angle-limiting filter-attached screen 3, the whole apparatus can be miniaturized, allowing to view a three-dimensional image from close to the view-angle-limiting filter-attached screen 3.

Further, since projection images including all such image divisions as shown in FIG. 2 may be continuously projected from the electronic projector 1, there is no need to care about the projection timing for each image division, and the image divisions projected from the electronic projector 1 are reflected on to the view-angle-limiting filter-attached screen 3, and a viewer viewing such reflected image divisions, clear three-dimensional images are visible from any direction and position.

Additionally, the electronic projector 1 may be set up either above or below the rotary shaft of the view-angle-limiting filter-attached screen 3. In the former case, projection is made downward from the projector while projection is made upward in the latter case. In addition, its vertical positions in the figures merely show its altitudinal relations with the rotary shaft and image for the purpose of facilitating understanding. Further, the altitudinal relation between the floor and the ceiling where the display apparatus is set up does not restrict its vertical position.

Figure 11:
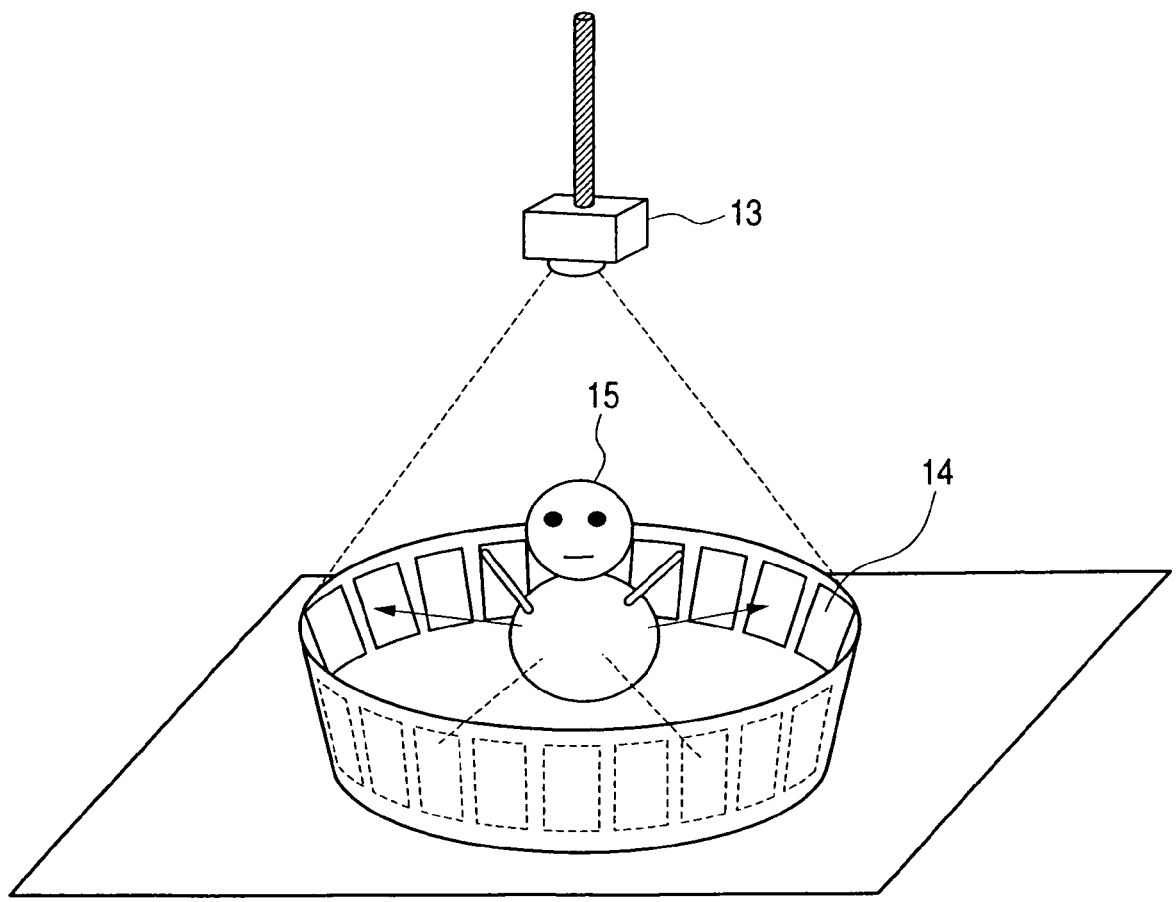
FIG. 11 is a diagram for explaining the principle of an image-pickup apparatus according to the present invention for producing an projection image as shown in FIG. 2.

FIG. 11 shows the principle of the image-pickup apparatus according to the present invention for producing projection images as shown in FIG. 2. In this drawing, 13 is a CCD camera, 15 is an object (object of image pickup). In this figure, a polyhedral mirror 14, the same as the polyhedral mirror 5 in FIG. 1, comprises of a plurality of mirrors arrayed on the surface of a circular corn. The object of image pickup 15 is set so as for its center to be on the central axis of the circular corn. The CCD camera 13 is set up at an upper position along the central axis of the circular corn facing downward. The polyhedral mirror 14 is whole within the pickup vision of the CCD camera 13. Each mirror of the polyhedral mirror 14 corresponds to the direction a to p of in FIG. 4, the images of the object 15 reflected by the individual mirrors of the polyhedral mirror 14 are picked up by the CCD camera 13 as image divisions respectively, allowing to obtain e.g. the images as shown in FIG. 2. Incidentally, the images to be picked up by the CCD camera 13 may be either still images or moving images.

Figure 12:
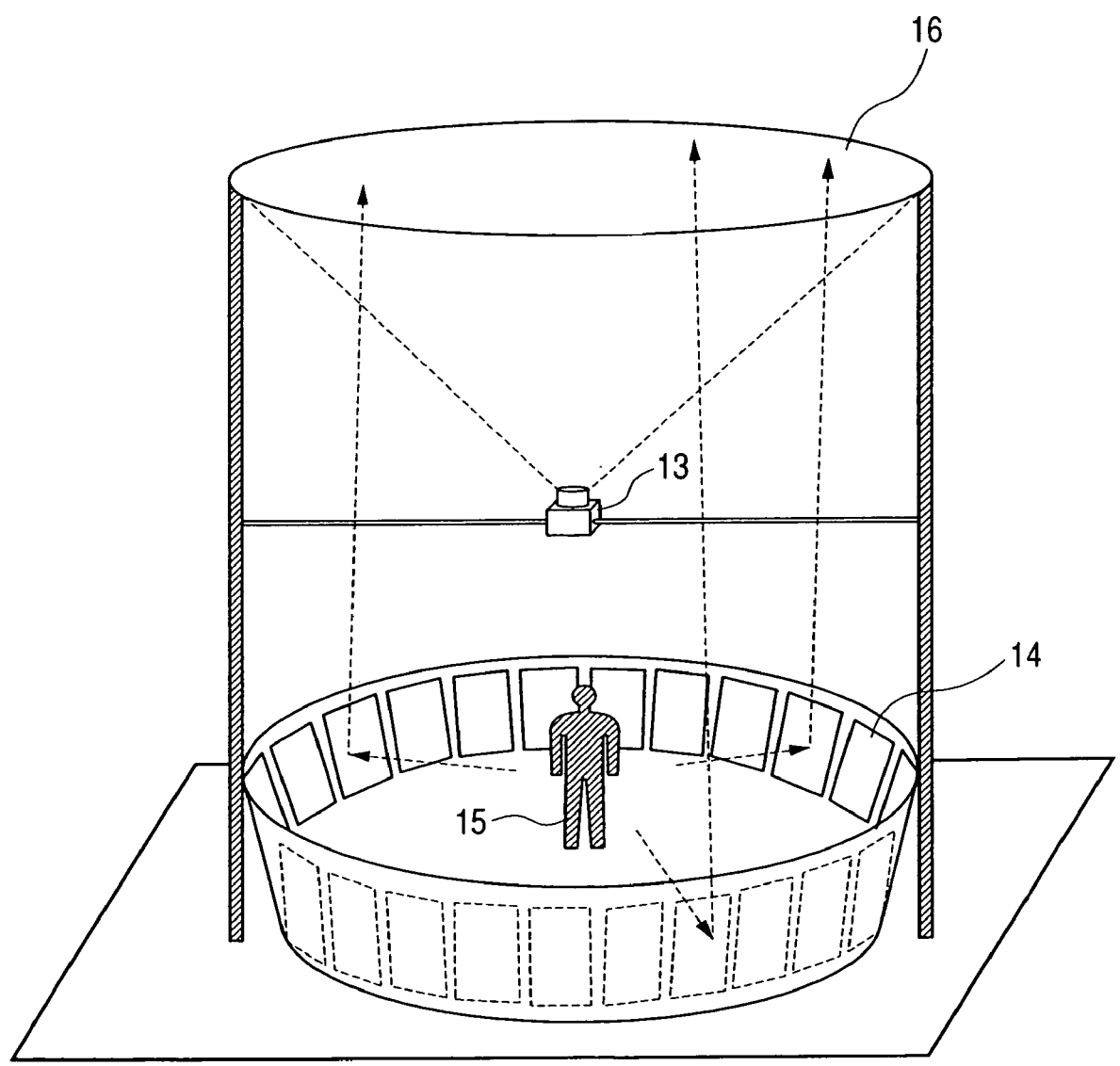
FIG. 12 is a perspective view of an image-pickup apparatus according to an embodiment of the present invention based on the principle shown in FIG. 11.

FIG. 12 is a block diagram of an image-pickup apparatus according to the first embodiment of the present invention based on the principle shown in FIG. 11, wherein 16 is a mirror, and the parts corresponding to those in FIG. 11 are marked with the same reference numerals. In this figure, an object of image-pickup 15 is a human body, and the apparatus is configured so as to pick up a whole image of the human body 15. The mirror 16 is set on the inner side of a ceiling higher than a CCD camera 13. The CCD camera 13 faces toward the mirror 16. Individual mirrors of a polyhedral mirror 14 are arrayed on the surface of a circular corn in the same manner as with the polyhedral mirror 14 in FIG. 11.

Individual images of the human body 15 as viewed from the direction a to p (FIG. 4) are reflected by the corresponding mirrors of the polyhedral mirror 14 and reflected again by the ceiling mirror 16 before picked up by the CCD camera 13, allowing to obtain such images as shown in FIG. 2. In this case, as long as light can reflect by the polyhedral mirror 14 to the direction of the mirror 16, there is no restriction to the object of image-pickup, allowing for also a plurality of objects.

Figure 13:
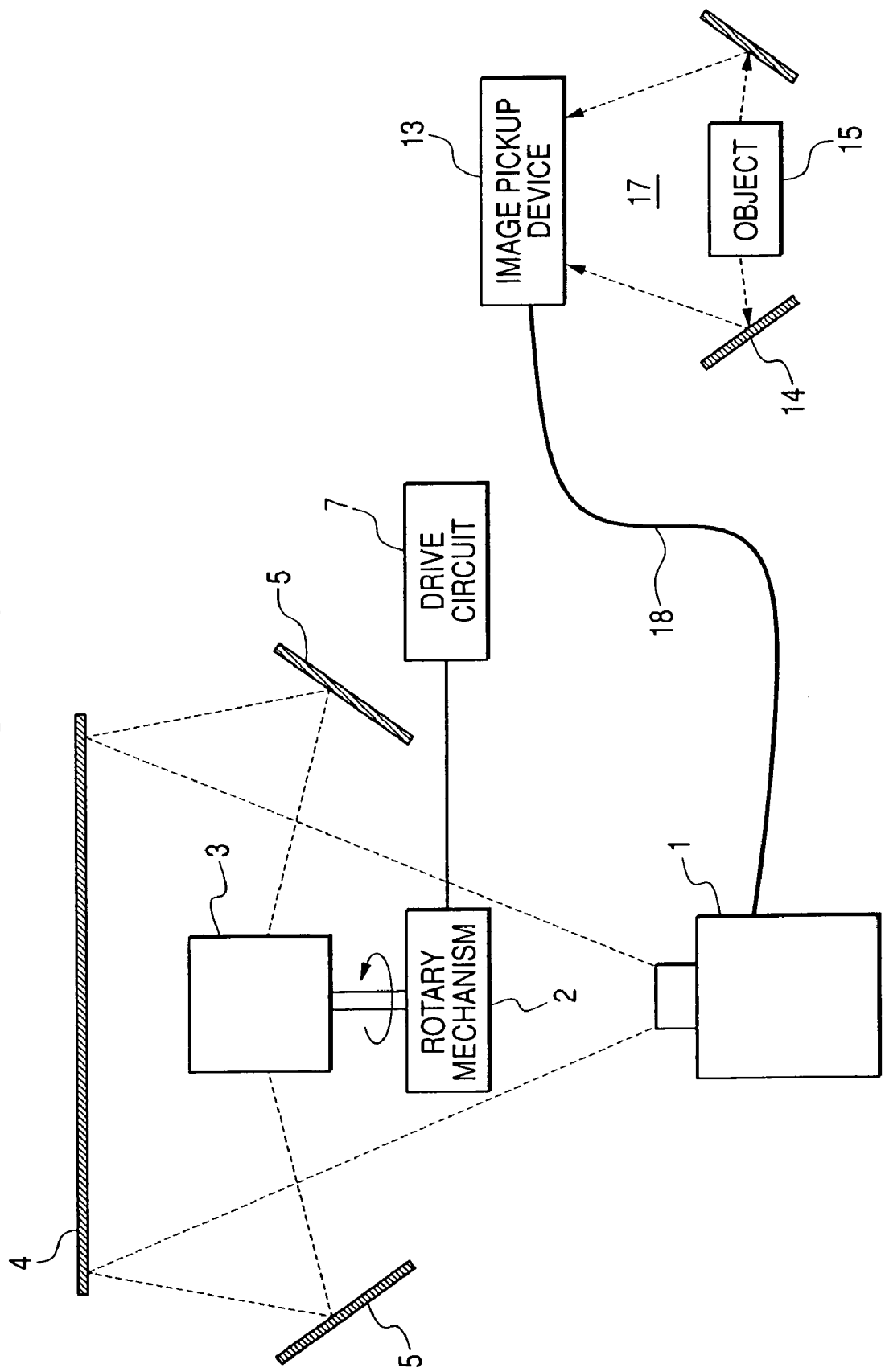
FIG. 13 is a general block diagram of a second embodiment of the display apparatus according to the present invention.

FIG. 13 is a block diagram of a second embodiment of the display apparatus according to the present invention, wherein 17 is a projection-image-pickup apparatus based on the principle shown in FIG. 11, 18 is a communication path, and other parts corresponding to those in FIG. 3 and FIG. 11 are marked with the same reference numerals and explanations are not repeated. In this figure of the second embodiment, a display apparatus is connected with the image-pickup device 17 via the communication path 18. The image-pickup device 17, upon obtaining projection images by CCD camera 13 as described with reference to FIG. 11, processes the projection images to generate image signals in NTSC/PAL or other formats, and sends them to the display apparatus via the communication path 18. The display apparatus, receiving the image signals, converts them to the original picked-up images, and send them to the electronic projector 1. By this, the same as with the first embodiment, the image divisions of the object 15 are displayed on the view-angle-limiting filter-attached screen 3 in accordance with its rotation, realizing, in addition to the production of projection images, a real time display of three-dimensional images.

Here, for the communication path 18, either cable or radio communication is possible. It is also possible to send acquired projection images to a remote display apparatus via a network. In this case, the image signals may be sent in a digital image format such as MPEG. Now, with this second embodiment of the display apparatus, a three-dimensional image of the object 15 can be viewed at a remote place.

Further, the principle of this image-pickup apparatus as shown in FIG. 11 allows its size to be adapted to the size of the image-pickup object. That is, the image-pickup apparatus can be optimized to the image-pickup object by designing the size of each face of the circular conical polyhedral mirror and the diameter of the mirror circle according to the size of the image-pickup object. As for the setup position of the CCD camera also, its height is adjusted so that the whole circular conical polyhedral mirror be within the vision of the camera and the image divisions from all mirrors of the polyhedral mirror be picked up.

Figure 14:
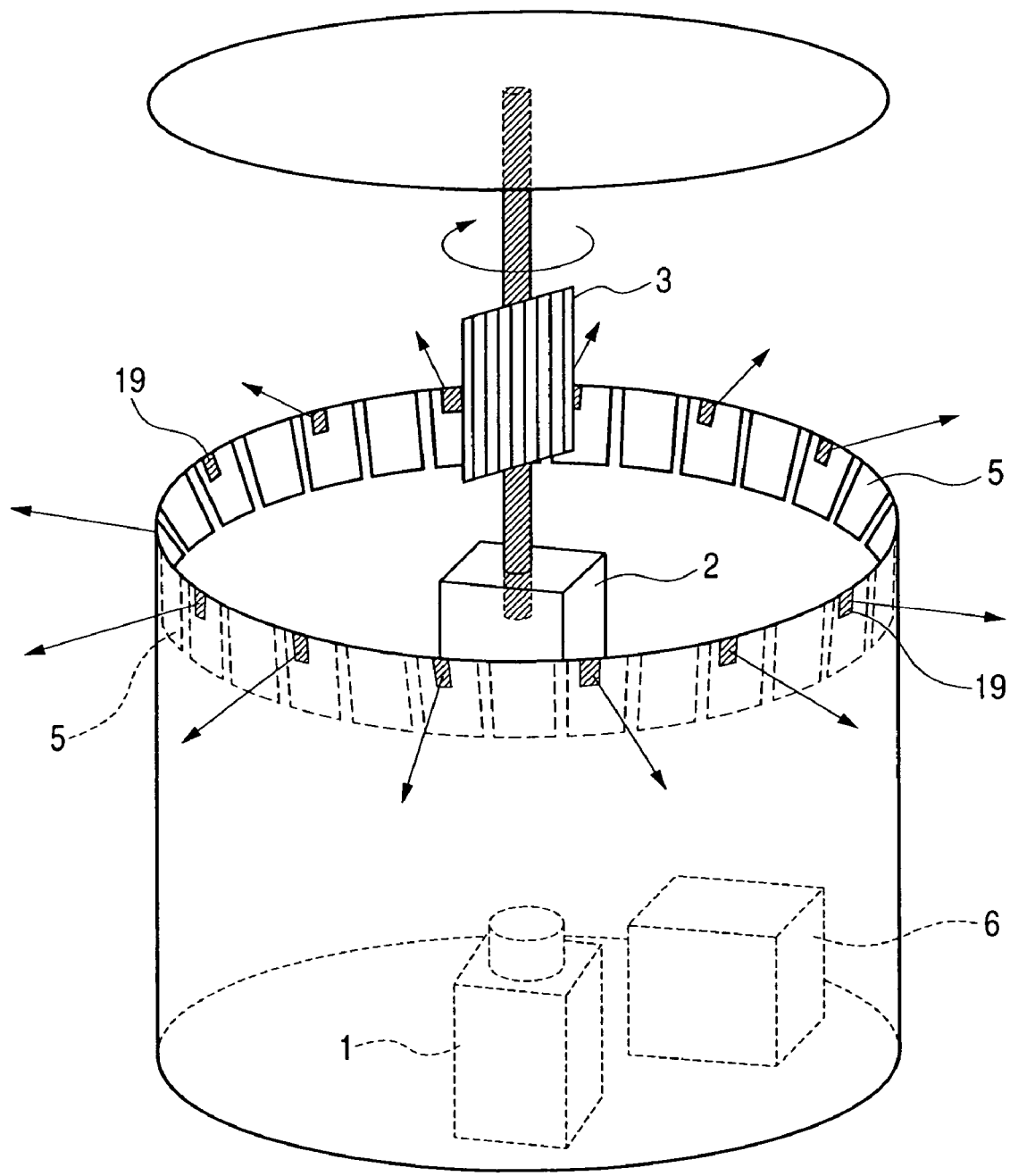
FIG. 14 is a perspective view showing a substantial configuration of a third embodiment of the display apparatus according to the present invention.

FIG. 14 is a perspective view of a third embodiment of the display apparatus according to the present invention, wherein 19 is a sensor and the other parts corresponding to those in FIG. 1 are marked with the same reference numerals and explanations are not repeated. This third embodiment provides an interactive function to a display apparatus. As shown in FIG. 14, it is possible to detect an approaching person by arranging a plurality of sensors 19 around the display apparatus or laying out mat switches on the floor. It is also possible to detect the direction of the viewer, for example, one of a to p as shown in FIG. 4, by using as many sensors, such as infrared ray sensors, proximity sensors and microphones, as the directions to be detected (for example, 16 for directions a to p). In this case, the movement of the viewer can be detected roughly from the differences among the signals acquired from adjacent sensors.

With sensors 19 set up as shown in FIG. 14, signals from the sensors 19 are processed by a control unit 6. And, images responding to the viewer's movement are sent by the control unit 6 to the electronic projector 1. For example, it is possible to provide such an interaction as the view-angle-limiting filter-attached screen 3 is rotated so that a character projected to the view-angle-limiting filter-attached screen 3 be turned to face an approaching person according to the person's approaching direction detected from the fluctuation of signals from the sensors 19. The move of an image of the character turning to the viewer can be realized, for example, by storing in the control unit 6 the image divisions Ga to Gp in FIG. 5, and, when images as shown in FIG. 2 are projected by the electronic projector 1, by successively projecting image divisions Ga to Gp shifted circularly by one or more divisions at a time. It is also possible to display its front image division to the direction of the detected person according to the stored directional information about the image divisions.

In addition, it is possible to provide such an interaction as the direction of the character is changed in response to the direction and the movement to which, for example, the viewer's hand moved and which are detected from the differences among the signals from adjacent sensors. Further, it is also possible to detect approaching plural persons and their motions and generate images in response to them if more sensors are set.

Figure 15:
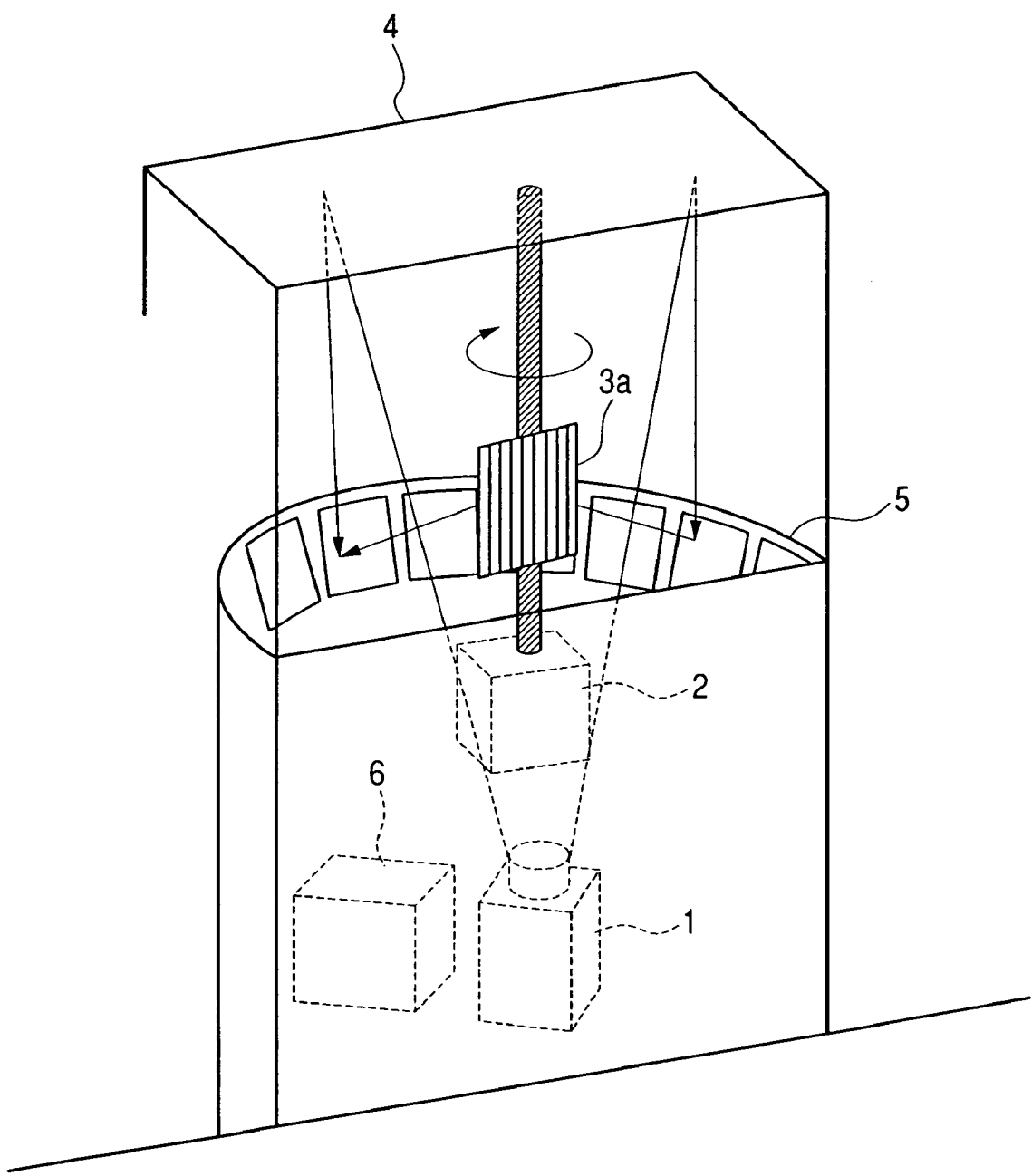
FIG. 15 is a perspective view showing a substantial configuration of a display apparatus according to a fourth embodiment of the present invention.
Figure 16:
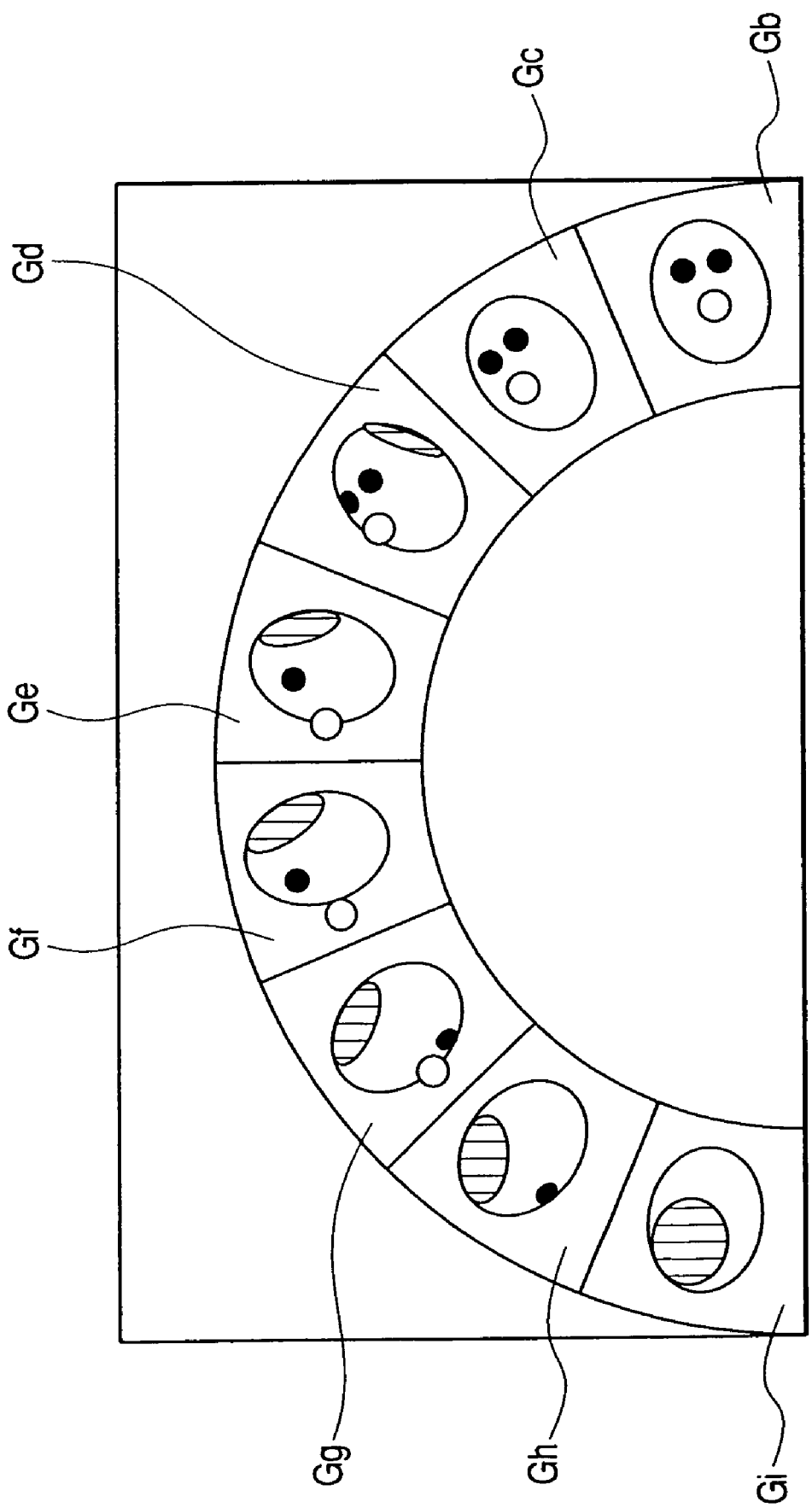
FIG. 16 is a diagram illustrating an example of a projection image used in the display apparatus of the fourth embodiment of the present invention shown in FIG. 15.

FIG. 15 is a perspective view of the fourth embodiment of the display apparatus according to the present invention, wherein 3a is a view-angle-limiting filter-attached screen and other parts corresponding to those in FIG. 1 are marked with the same reference numerals. This figure of the fourth embodiment describes a semi-cylindrical display apparatus, wherein a polyhedral mirror 5 consists of a plurality of mirrors arrayed on the surface of a semi-circular cone. A view-angle-limiting filter-attached screen 3a is rotated continuously or stepwise by a rotary mechanism (rotary drive source) 2. Reference numeral 4 is a mirror attached to the inner side of the ceiling of the display apparatus. These polyhedral mirror 5 and mirror 4 form a projection optical system. An electronic projector 1 projects a projection image, e.g. as shown in FIG. 16, of image divisions Ga to Gi arrayed semi-circularly. A control unit 6 stores such projection image data and sends them to the electronic projector 1.

Figure 17:
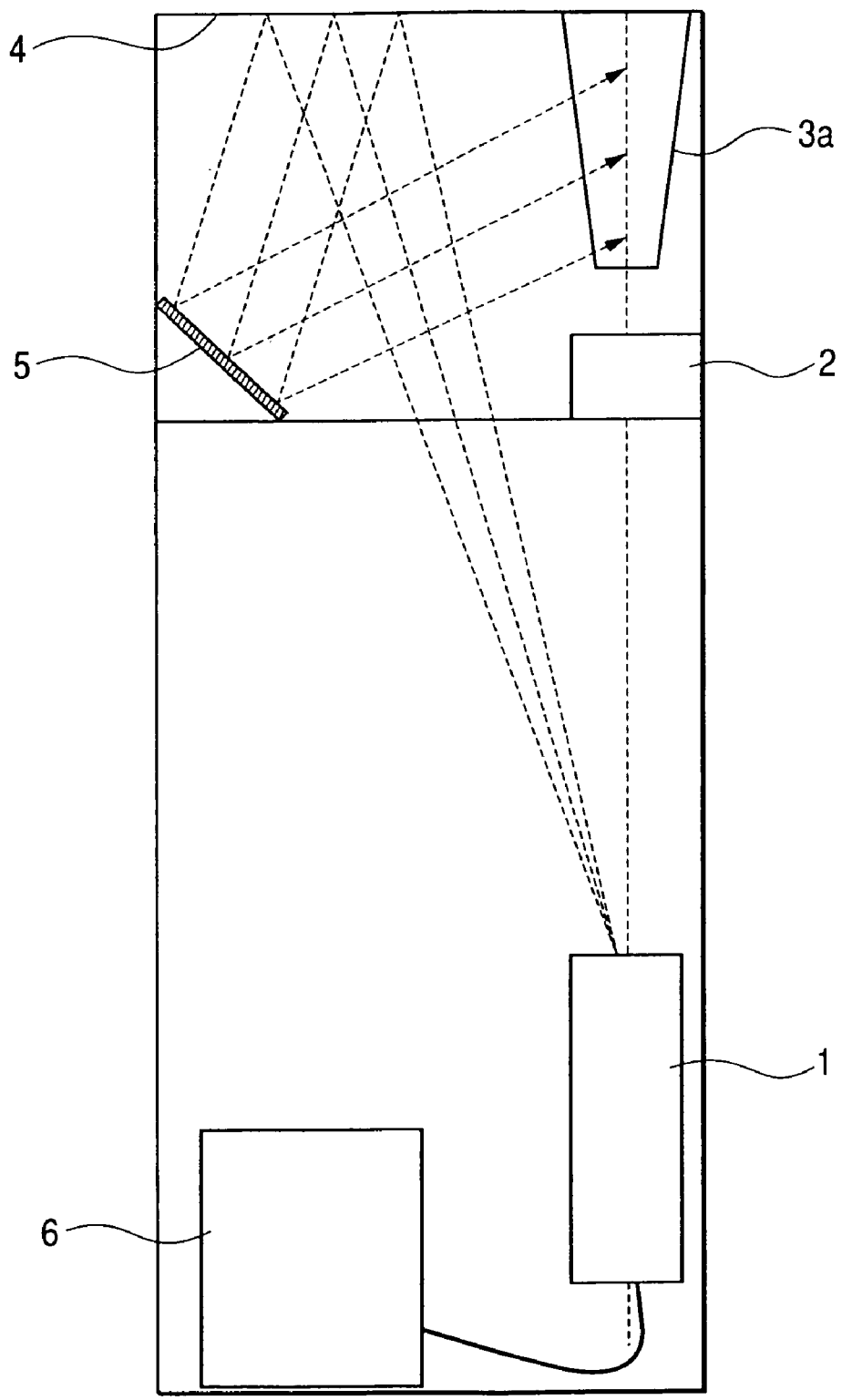
FIG. 17 is a longitudinal sectional view of the fourth embodiment of the display apparatus according to the present invention shown in FIG. 15.

FIG. 17 is a longitudinal sectional view of the fourth embodiment of the display apparatus according to the present invention. In this figure, a electron projector 1 projects a projection image as shown in FIG. 16 sent from a controlling unit 6. A mirror 4 attached to the inner side of the ceiling reflects this projected image, and then each image division Ga to Gi of the projected image is reflected by each mirror of polyhedral mirror 5, to be projected to the view-angle-limiting filter-attached screen 3.

The projection image projected from the electronic projector 1, as shown in FIG. 16, is an image of the image divisions Gb to Gi (those shown in FIG. 5) that are divided images of an object as viewed from different directions around the object arranged semi-circularly in a ring area. The images in FIG. 16 may be either created freely by computer graphics or the like or produced by a CCD camera as described with reference to FIG. 11.

In this configuration of a display apparatus according to the forth embodiment of the present invention, the control unit 6 reads out and sends image data, such as those shown in FIG. 16, to the electronic projector 1. The electronic projector 1 projects the projection image of the received image data. The image divisions Gb through Gi in the ring area of the projected projection image are reflected by the ceiling mirror 4, and again by the corresponding faces of the mirrors of the polyhedral mirror 5 arrayed semi-circularly on the surface of a circular cone, then projected to the view-angle-limiting filter-attached screen 3a respectively from the corresponding directions b to i as shown in FIG. 4. The view-angle-limiting filter-attached screen 3a has the property of transmitting an image projected to the rear surface. To allow a different image to be viewed depending on the viewing direction, its horizontal view angle should be limited and it should have a vertically wide range of viewing angles. Therefore, the screen is made of such a semi-transmitting diffusion film as used for rear projection displays.

Figure 18:
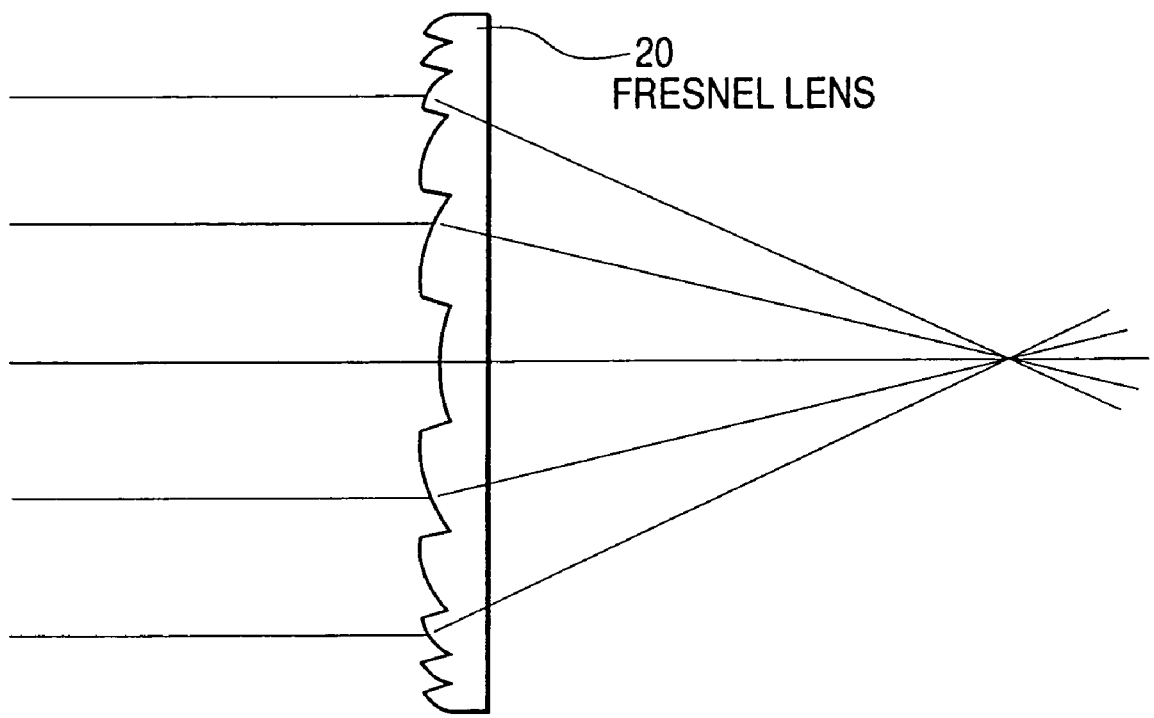
FIG. 18 is a diagram showing the feature of a Fresnel lens.

The view-angle-limiting filter-attached screen 3a may be implemented by using a Fresnel lens. FIG. 18 shows the feature of a Fresnel lens 20. In this figure, the Fresnel lens 20 has not a continuously curved surface but a stepped surface. If a Fresnel lens 20 is used, since light is transmitted to the same direction as the incident direction and condensed to a predetermined position, the viewer can view an image being projected to each face of the mirrors of the polyhedral mirror 5 arrayed, semi-circularly on the surface of a circular cone when he is at a position along the line connecting each such mirror and the screen using the Fresnel Lens 20 (Fresnel lens screen). That is, similar to the retroreflection described with the first embodiment, using a Fresnel lens 20 allows the viewer to view the image corresponding to the viewing direction. In addition, the viewer can continue to view the same image while the angle of the Fresnel lens screen 3a is within a certain range (within the view angle) relative to the viewing direction.

Figure 19A:
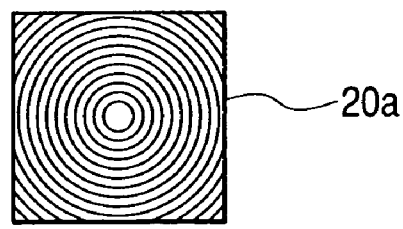
FIGS. 19(a) and 19(b) show different types of Fresnel lense.
Figure 19B:
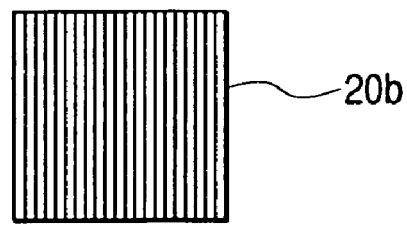

FIG. 19 shows two types of Fresnel lenses. A Fresnel lens 20a in FIG. 19(a) has spherical surfaces cut concentrically, which is the most popular. The Fresnel lens 20a condenses light both horizontally and vertically. Thus if this lens is used as the view-angle-limiting filter-attached screen 3a in FIG. 15 or FIG. 17, the image divisions reflected by each mirror of the polyhedral mirror 5 can be viewed only within the view angle range of the Fresnel lens both horizontally and vertically. Therefore, using a Fresnel lens 20b shown in FIG. 19(b) having a surface cut only horizontally is considered appropriate as the material of the view-angle-limiting filter-attached screen 3a since it condenses light only horizontally.

Figure 20:
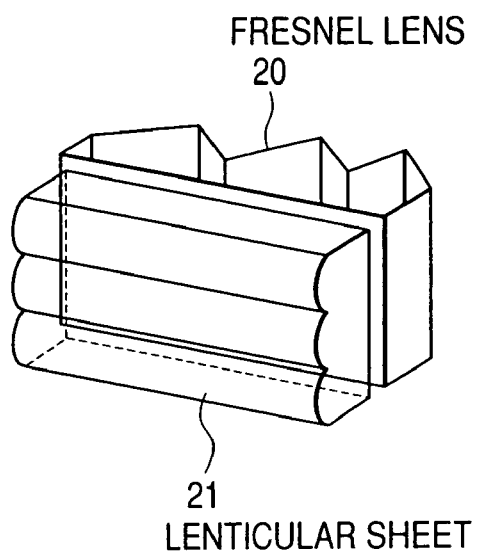
FIG. 20 is a diagram of a Fresnel lens realizing vertical diffusive reflection.

Further, to suppress the vertical condensing in order to allow an image to be viewed from a wider range, the screen is configured so as to vertically cause diffusive reflection. FIG. 20 is a structure to let the Fresnel lens perform diffusive reflection vertically. By attaching (sticking) a lenticular sheet 21, which is similar to the lenticular sheet 11b shown in FIG. 8, to the surface of the Fresnel lens 20, vertical diffusive reflection can be realized. This makes the whole view-angle-limiting filter-attached screen 3a uniformly bright in the vertical direction, resulting in an easier-to-view image displayed.

Figure 21:
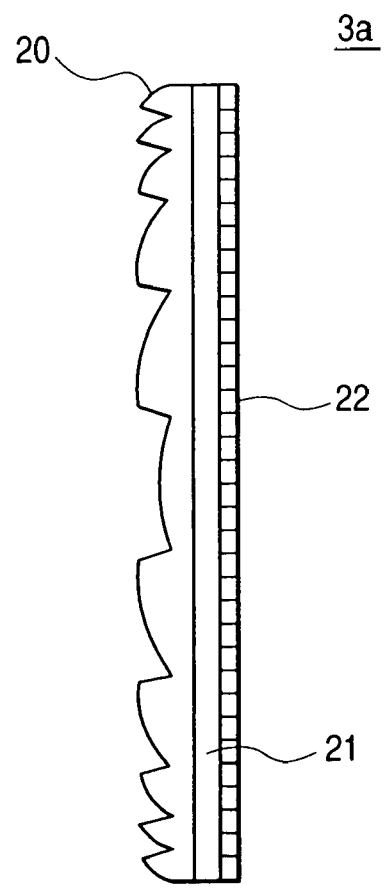
FIG. 21 is a sectional view of the view-angle-limiting filter-attached screen in FIG. 15 using the Fresnel lens shown in FIG. 20.

FIG. 21 is a structure (top view) of the view-angle-limiting filter-attached screen 3a in FIG. 15 using a Fresnel lens, wherein the parts corresponding to those in FIG. 20 have the same reference numerals. In this figure, the lenticular sheet 21 shown in FIG. 20 is attached to the Fresnel lens 20 in order to cause diffusive reflection vertically. Further, in order to limit the view angle, fins are attached to form a view angle-limiting filter 22 in the same manner as the view-angle-limiting filter 9b shown in FIG. 6, or such a view-angle-limiting filter as used for the liquid crystal displays of PCs, mobile phones is attached.

Unlike in the first embodiments, in the forth embodiment described so far, the image to be viewed is projected from the rear. Therefore, flickering is suppressed since fin edges in the view-angle-limiting filter are not directly lit up. This results in a high contrast image displayed. In addition, in this forth embodiment, although the viewer cannot fully moves around, the viewer can get closer to the view-angle-limiting filter-attached screen 3a from the side where the polyhedral mirror is not set as compared with the fully cylindrical display apparatus of the first embodiment. Further, to enlarge the view-angle-limiting filter-attached screen 3a and the image displayed on the screen in the cylindrical display apparatus of the first embodiment, the scale of the whole apparatus must be enlarged, resulting in a longer distance between a viewer and the screen. In the case of the forth embodiment, the scale of the whole apparatus can be enlarged without making longer the distance between a viewer and the screen 3a.

In the first embodiment, a projection image with image divisions such as Ga to Gp (16 divisions) shown in FIG. 2 arranged circularly in a ring form is projected from an electronic projector 1. In the forth embodiment, a projection image with image divisions such as Gb to Gi (8 divisions) shown in FIG. 16 arranged semi-circularly is projected. Therefore, if the resolution of the images projected from the electronic projector 1 is the same, since the number of image divisions required in the forth embodiment is half that required in the other embodiments, the resolution of each image division projected by the electronic projector 1 in the forth embodiment is four times as high as that in the first embodiment, making the projected image divisions by the forth embodiment more expressive.

Note that although the internally polyhedral mirror is assumed to form a half of a circle in the above description of the forth embodiment, it may also be extended or reduced so as to form a larger or smaller part of the circle. The angular range of the three-dimensional image which can be viewed is determined by the angular range covered by the mirror arranged cylindrically. By using a light transmittance low reflection screen, it is also possible to form a fully cylindrical display apparatus like in the first embodiment.

Figure 22:
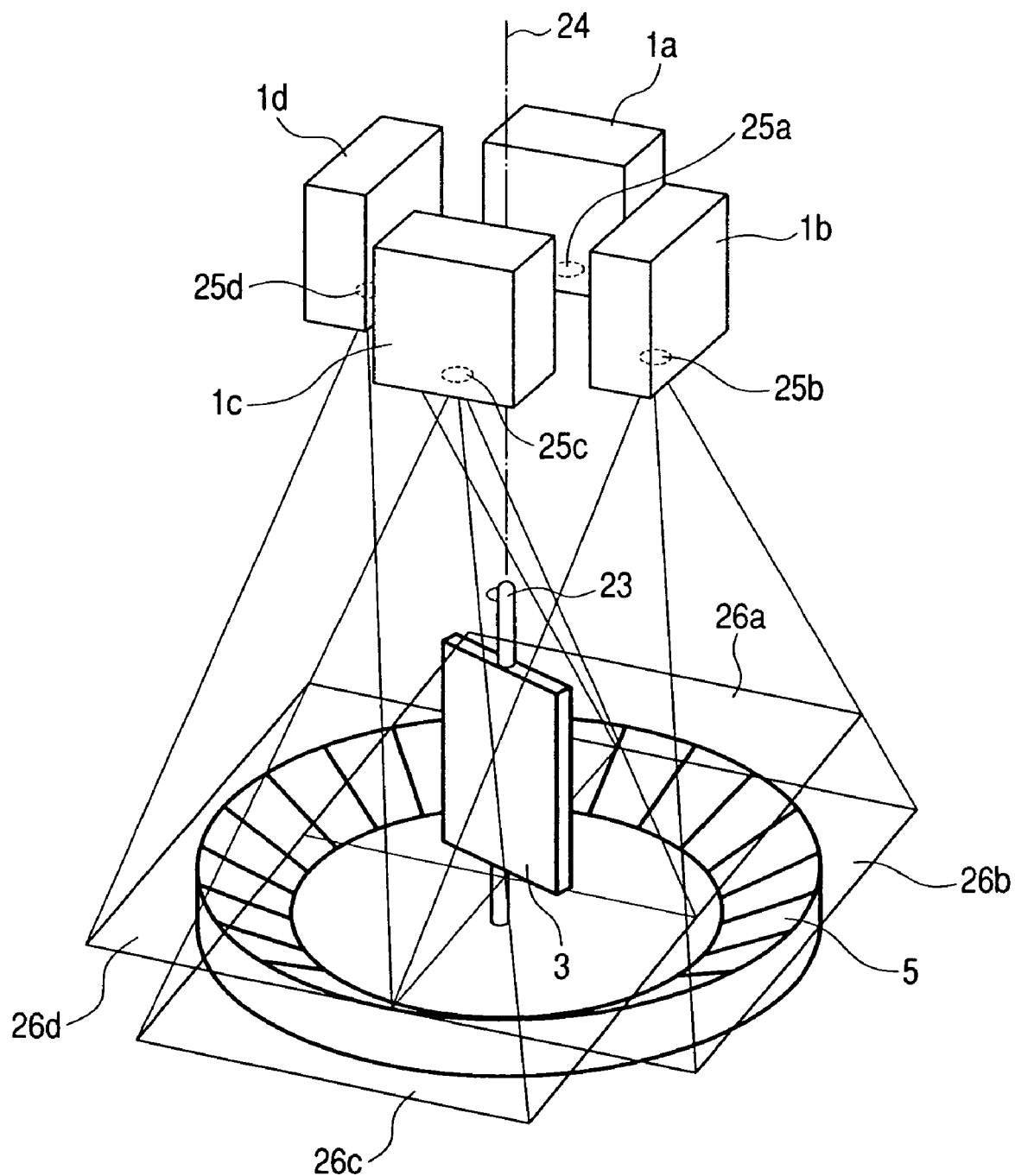
FIG. 22 is a perspective view showing a substantial configuration of a fifth embodiment of the display apparatus according to the present invention.

FIG. 22 is a block diagram of the fifth embodiment of the display apparatus according to the present invention, wherein 1a to 1d are electronic projectors, 25a to 25d are projection optical systems, 26a to 26d are image-projection areas and other parts corresponding to those in afore mentioned figures are given the same reference numerals. The fifth embodiment uses a plurality of electronic projectors, and in this figure, four electronic projectors 1a to 1d are used. These electronic projectors 1a to 1d are set (arranged) above a polyhedral mirror (mirror group) 5 and in such a manner that the individual centers of their optical systems 25a to 25d be on a circle of a diameter whose center is on the extension axis 24 of a rotary axis 23 of the view-angle-limiting filter-attached screen 3 and be equally spaced (90 degrees equal-angularly with respect to the extension axis 24).

These electronic projectors 1a to 1d individually project images to a part of the polyhedral mirror 5. The image-projection area 26a is the area where an image projected from the electronic projector 1a is projected, and at least such number of mirrors of the mirror 5 as the number of mirrors constituting the polyhedral mirror 5 divided by the number of the electronic projectors are wholly included within this image-projection area, and are filling the image protection area 26a. For example, if the polyhedral mirror 5 comprises of 24 mirrors, the number of electronic projectors being 4, the number of mirrors that are wholly included within the image-projection area 26a is at least 6.

The image-projection area 26b is the area where an image projected from the electronic projector 1b is projected, and 6 mirrors next to the 6 mirrors being wholly included within the image protection area 26a are wholly included within this image-projection area 26b, and are filling the image-projection area 26b. Likewise, the image-projection area 26c is the area where an image projected from the electronic projector 1c is projected, and 6 mirrors next to the 6 mirrors being wholly included within the image protection area 26b are wholly included within this image-projection area 26c, and are filling the image-projection area 26c. The image-projection area 26d is the area where an image projected from the electronic projector 1d is projected, and 6 mirrors next to the 6 mirrors being wholly included within the image protection area 26c are wholly included within this image-projection area 26*d*, and are filling the image-projection area 26*d*. This configuration is the same also with the specific example described below.

This will be explained again with reference to FIG. 23. Supposing a polyhedral mirror 5 consists of 24 mirrors, mirror 5(1) to mirror 5(24), the mirror 5(1) to mirror 5(6) are wholly included within an image-projection area 26*a*, the mirror 5(7) to mirror 5(12) are wholly included within an image-projection area 26*b*, the mirror 5(13) to mirror 5(18) are wholly included within an image-projection area 26*c*, and the mirror 5(19) to mirror 5(24) are wholly included within an image-projection area 26*d*.

Figure 24:
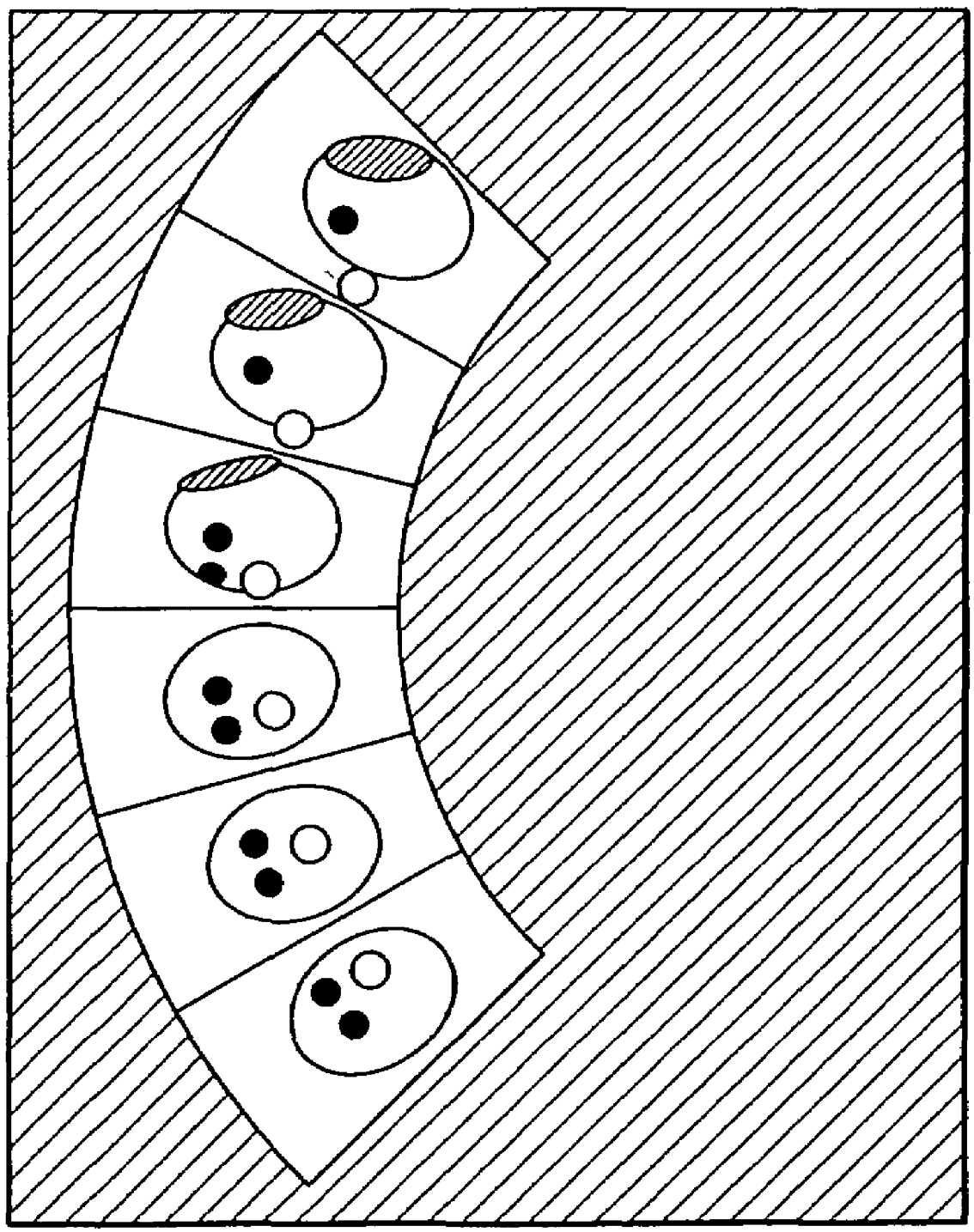
FIG. 24 is a schematic diagram of a projection image to be projected by an electronic projector in FIG. 22.

In the fifth embodiment of the display apparatus according to the present invention, the polyhedral mirror 5 being configured with 24 mirrors, mirror 5(1) to mirror 5(24), a projection image like that shown in FIG. 2 which has 24 image divisions arranged in a ring form may be used, wherein each electronic projector 1*a* to 1*d* takes up 6 image divisions to project to the mirrors that are wholly within the corresponding image-projection area. FIG. 24 shows, as an example, the projection image to be projected from the electronic projector 1*d*, which includes 6 image divisions in such an arrangement as correspond to the arrangement of the mirror 5(19) to 5(24) in the image-projection area 26*d*. And for projecting these image divisions to the mirror 5(19) to 5(24), the position and direction of an aperture 25*d* (FIG. 22) of the electronic projector 1*d* is adjusted so as for the center of the projected image divisions to be at the center of the corresponding mirrors. This goes the same with other electronic projectors 1*a* to 1*c*.

Individual image divisions in the projection image projected from each electronic projector 1*a* to 1*d* are reflected by the corresponding mirrors of the polyhedral mirror 5, and then projected to a view-angle-limiting filter-attached screen 3. In the case of the display apparatuses of the first to forth embodiment of the present invention, the aperture of the electronic projector 1 is on the extension axis 24 of the rotary axis 23 of the view-angle-limiting filter-attached screen 3, and the individual mirror faces of the polyhedral mirror 5 are arranged on the same surface of a circular cone, allowing to project image divisions properly on the view-angle-limiting filter-attached screen 3. However, in this display apparatus of the fifth embodiment, the apertures 25*a* to 25*d* of the electronic projector 1*a* to 1*d* are shifted from the extended axis 24, therefore, if the individual mirror faces of the polyhedral mirror 5 are arranged on the same surface of a circular cone, the image divisions reflected by individual mirrors of the polyhedral mirror 5 will be projected each position being shifted from each right position on the view-angle-limiting filter-attached screen 3. With this shifted (deviated) image projection, when a viewer moves around the view-angle-limiting filter-attached screen 3 to view the projected images on the view-angle-limiting filter-attached screen 3, the position of the projected image fluctuates depending on the viewer's position, displaying unnatural images. For example, if an image of a still object is projected and displayed, a viewer moving around the view-angle-limiting filter-attached screen 3 will see the projected image moving from right to left or up and down.

In order to suppress an unnatural movement of the projected images displayed on the view-angle-limiting filter-attached screen 3, with this fifth embodiment, 6 mirrors of the polyhedral mirror 5 to which the individual electronic projectors 1*a* to 1*d* project image divisions are divided as one set so that direction (inclination and position) of each mirror can be adjusted for each set.

That is, individual mirrors are adjusted so that they will be at proper position and angle (inclination) on the optical path of the optical system which is formed between the electronic projector and the screen when individual image divisions projected from the corresponding electronic projector are reflected by the mirror faces and then projected to a view-angle-limiting filter-attached screen 3.

Figure 25:
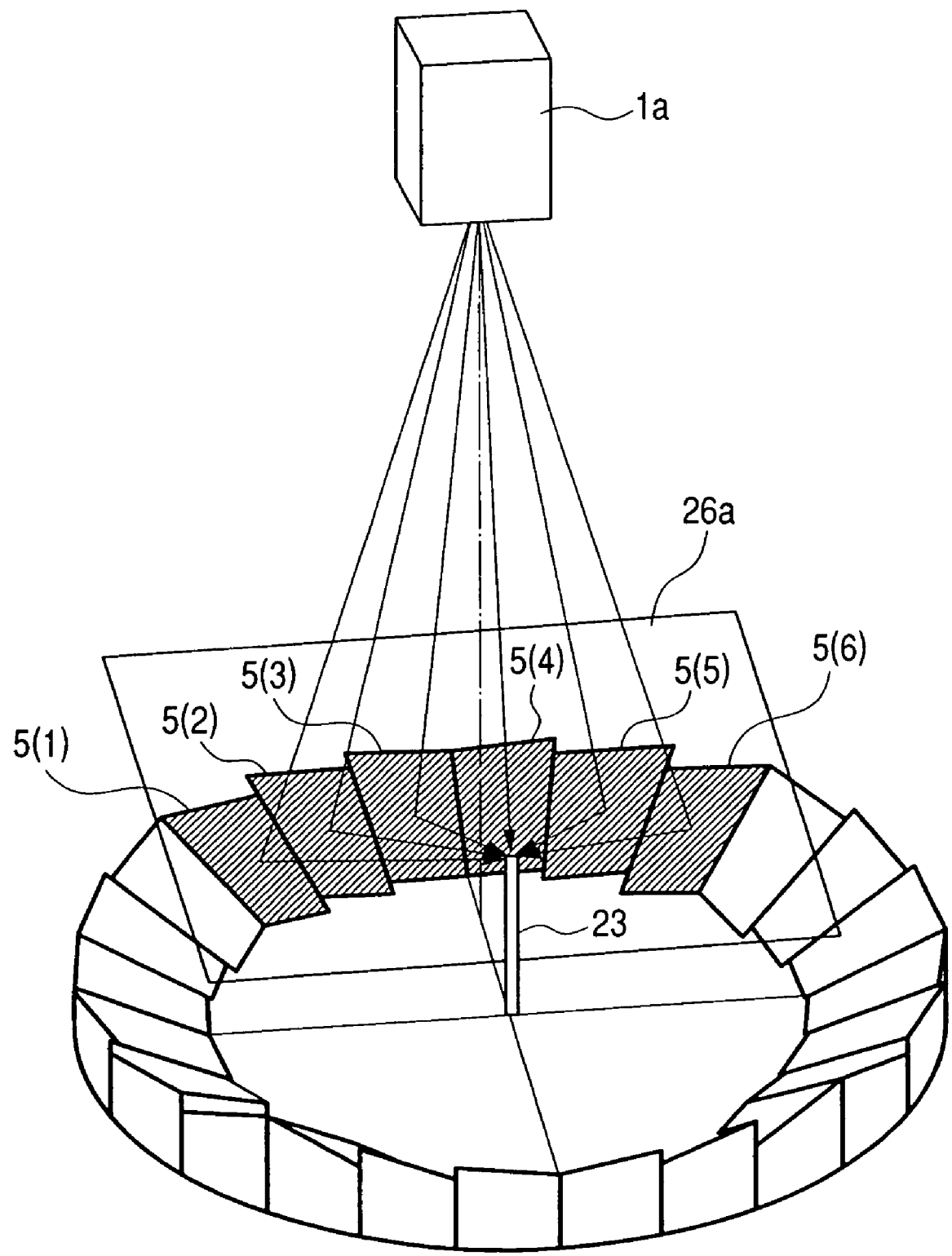
FIG. 25 is a diagram explaining the alignment of the mirrors in the polyhedral mirror corresponding to an electronic projector in FIG. 22.

With reference to FIG. 25, the mirror adjustment in relation to the electronic projector 1*a* is explained. The inclination of the mirrors 5(1), 5(2), 5(3), 5(4), 5(5), and 5(6) is set so that the light of the center of the individual image divisions in the projected image projected from the electronic projector 1*a* is reflected at the center of the corresponding mirror 5(1), 5(2), 5(3), 5(4), 5(5), and 5(6) of the polyhedral mirror 5 and then condenses into the rotary axis 23 of the view-angle-limiting filter-attached screen 3, more specifically, into the center of the view-angle-limiting filter-attached screen 3.

Now, a conical surface with an inclination of a borderline between mirror 5(3) and mirror 5(4) is assumed at the center position of these mirror 5(1) to 5(6) and the assumed conical surface has the inclination of the borderline so that when a mirror is set at this border position of the conical surface, the center of the projected light from the electronic projector 1*a* is reflected at the center of this mirror and projected to the center of the view-angle-limiting filter-attached screen 3. And the mirrors 5(1) to 5(6) are set so as to have certain inclination on this assumed conical surface. Concrete numerical value of the certain inclination of each mirror 5(1) to 5(6) which can be obtained by calculation, is omitted. The mirror 5(3) and mirror 5(4) will be set to be inclined toward each other by the same angle on the assumed conical surface, and mirror 5(2) and mirror 5(5) will be set to be inclined toward each other by the same angle on the assumed conical surface, and mirror 5(1) and mirror 5(6) will be set to be inclined toward each other by the same angle on the assumed conical surface, by centering on the borderline between mirror 5(3) and mirror 5(4). In this case, the degree of inclination of mirror 5(2) and mirror 5(5) will be larger than that of mirror 5(3) and mirror 5(4), and the degree of inclination of mirror 5(1) and mirror 5(6) will be larger than that of mirror 5(2) and mirror 5(5).

By setting the mirrors 5(1) to 5(6) to have inclination on this assumed conical surface, the light of the center of the individual image divisions projected from the electronic projector 1*a* is reflected at the center of the corresponding mirror 5(1) to 5(6) and then condenses into the center of the view-angle-limiting filter-attached screen 3. As the result, the image divisions projected after being reflected by individual mirrors of the polyhedral mirror 5 are displayed at the right position on the view-angle-limiting filter-attached screen 3, and, even if a viewer views a three-dimensional image displayed on the view-angle-limiting filter-attached screen 3 moving around the apparatus as shown in FIG. 26, he will get a good three-dimensional image without any unnatural movement or fluctuation of the three-dimensional image.

In this fifth embodiment of the display apparatus according to the present invention, since a plurality of image divisions to display a three-dimensional image are shared by a plurality of (four in this case) electronic projectors 1*a* to 1*d* to display, the number of image divisions to be displayed by each electronic projector 1*a* to 1*d* is smaller than in the case of the first to fourth embodiment of the display apparatus, therefore, the size of each image division to be projected from the electronic projectors 1*a* to 1*d* can be as much larger, and the resolution of each image division as much higher. As the result, the three-dimensional image projected on the view-angle-limiting filter-attached screen 3 is of high resolution and definition.

Figure 26:
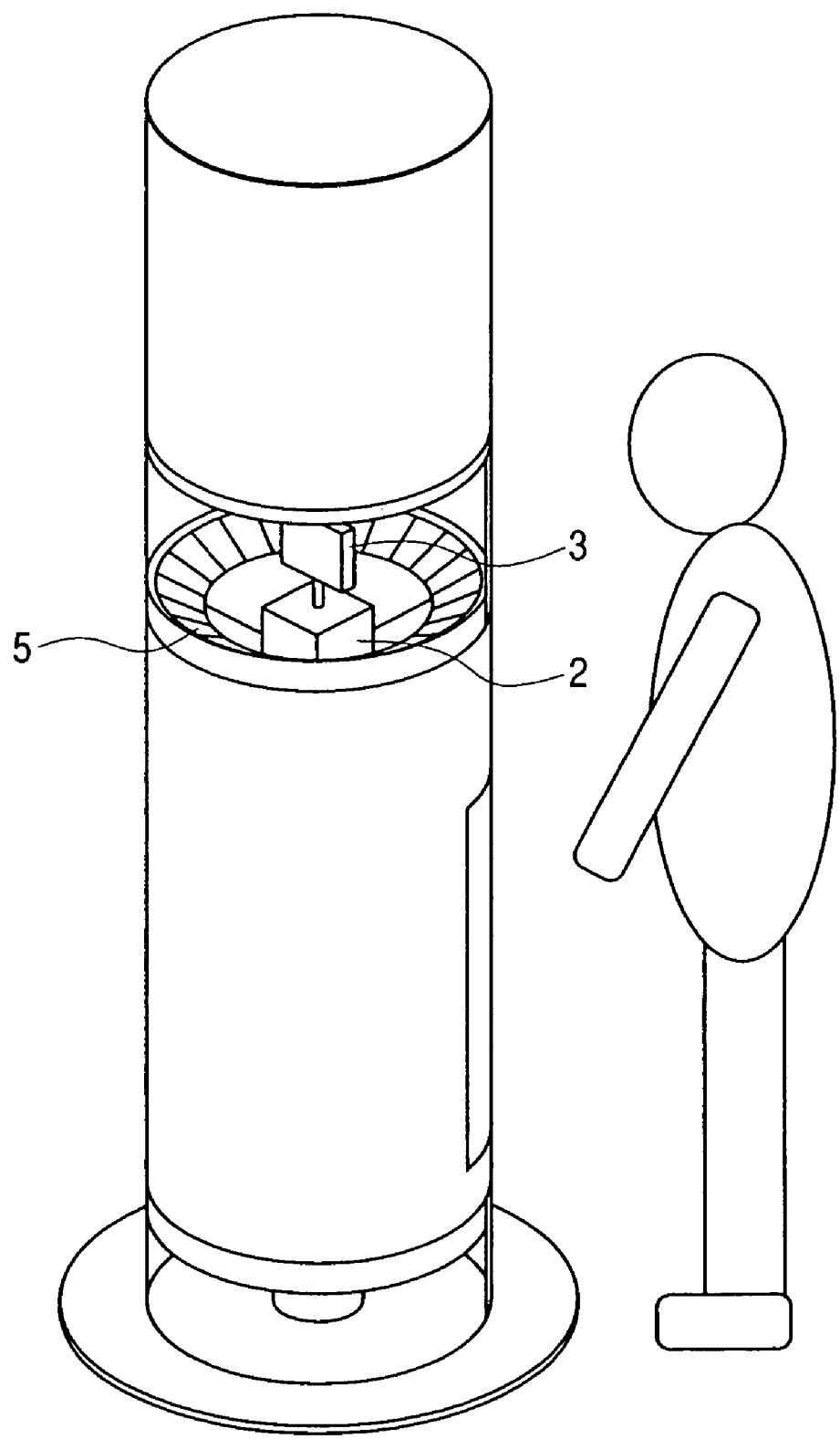
FIG. 26 is a perspective view showing an overall picture of a fifth embodiment of the display apparatus according to the present invention.
Figure 27:
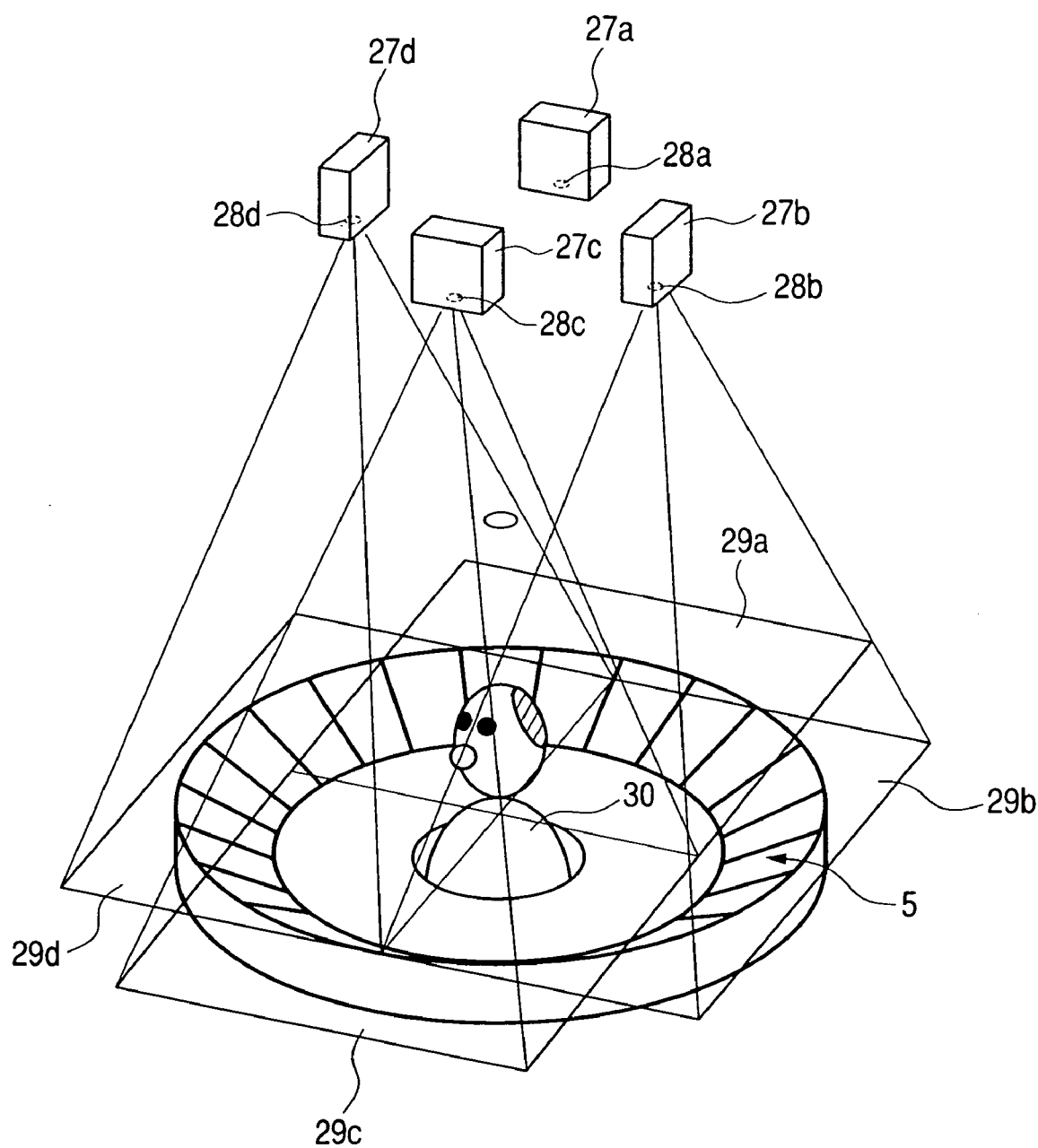
FIG. 27 is a block diagram of an image-pickup apparatus according to another embodiment of the present invention to produce projection images to be used by the individual electronic projectors in FIG. 22.

FIG. 27 is a block diagram of an image-pickup apparatus according to another embodiment of the present invention to produce projection images to be used by the individual electronic projectors 1a to 1d in FIG. 22. In the figure, 27a to 27d each is an image-pickup device such as a CCD camera, 28a to 28d each is an optical system of the image-pickup device 27a to 27d respectively, 29a to 29d each is an image-pickup area, and 30 is an image-pickup object, and other parts corresponding to those in FIG. 22 are marked with the same reference numerals. For producing projection images to be projected by each of the electronic projectors 1a to 1d, in a display apparatus shown in FIG. 22 or FIG. 26, the view-angle-limiting filter-attached screen 3 is removed from the rotational shaft 23 (FIG. 25), and a pickup object 30 is attach as shown in FIG. 27.

Namely, the position of the view-angle-limiting filter-attached screen 3 in FIG. 22 or FIG. 26 is now the position for an image-pickup object. And along with this, the electronic projectors 1a to 1d (FIG. 22) are replaced by image-pickup devices 27a to 27d. These image-pickup devices 27a, 27b, 27c and 27d pick up image-pickup areas 29a, 29b, 29,c and 29d respectively on the polyhedral mirror, wherein the position of image-pickup device 27a and the inclination of the optical axis of its optical system 28a (that is the direction of the image-pickup device 27a) are set so that the image-pickup area 29a agrees the image-projection area 26a for the electronic projector 1a in FIG. 22 or FIG. 23 (in this case, a perfect match is not required, but in terms of the point of resolution discussed below, the image-pickup area 29 is better be adjusted so that the plurality mirrors to pick up image divisions in the image-pickup area 29a be filling the area), and likewise, the position of image-pickup device 27b and the inclination of the optical axis of its optical system 28b (that is the direction of the image-pickup device 27b) are set so that the image-pickup area 29b agrees the image-projection area 26b for the electronic projector 1b in FIG. 22 or FIG. 23, the position of image-pickup device 27c and the inclination of the optical axis of its optical system 28c (that is the direction of the image-pickup device 27c) are set so that the image-pickup area 29c agrees the image-projection area 26c for the electronic projector 1c in FIG. 22 or FIG. 23, and the position of image-pickup device 27d and the inclination of the optical axis of its optical system 28d (that is the direction of the image-pickup device 27d) are set so that the image-pickup area 29d agrees the image-projection area 26d for the electronic projector 1d in FIG. 22 or FIG. 23.

Figure 28:
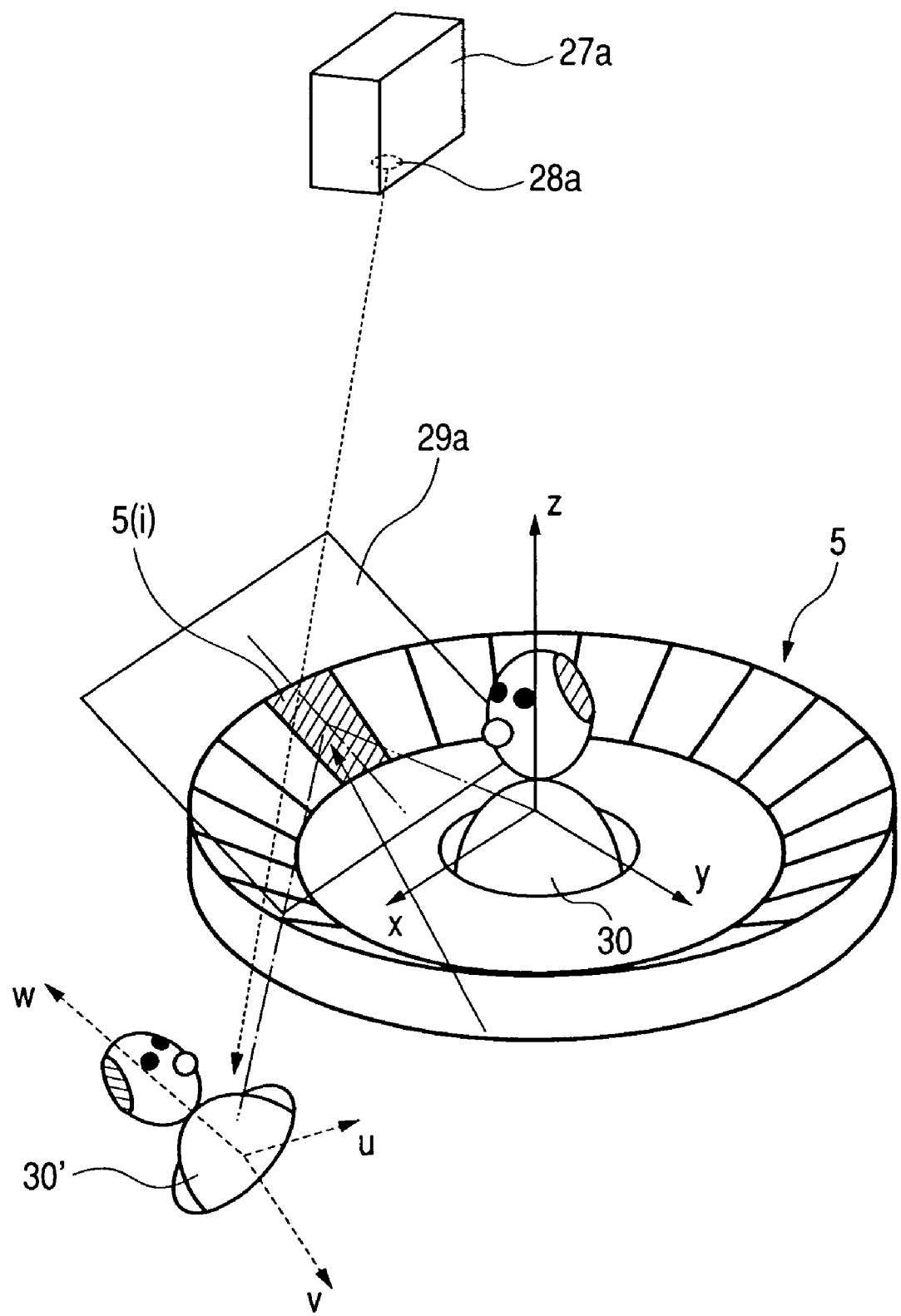
FIG. 28 is a diagram conceptually illustrating the manner the image-pickup device of the image-pickup apparatus in FIG. 27 picks up an image.

With this configuration, as shown in FIG. 28, seeing of mirror 5(i) which is one of a polyhedral mirror 5 within an image-pickup area 29a, an image-pickup device 27a picks up a virtual image-pickup object 30' that is in the symmetric position with an image-pickup object 30 with regard to the mirror 5(i). Compared with the three-dimensional coordinates of x (length), y (width), and z (height) for the image-pickup object 30, another three-dimensional coordinates u (length), v (width), and w (height) for the virtual image-pickup object 30' is tilted by the tilt of the face of the mirror 5(i) in the x, y, z coordinates. By this, the image-pickup device 27a can see the side of the vertical image-pickup object 30' which is same the side of the image-pickup object 30, through the mirror 5(i) in the same size. Therefore, the image-pickup device 27a can pick up the image of the side of the image-pickup object 30 viewable by way of the mirror 5(i).

The situation is the same also with the other mirrors of the polyhedral mirror 5 within the image-pickup area 29a and the sides of the image-pickup object 30 as seen by individual mirrors within the image-pickup area 29 are picked up simultaneously by the image-pickup device 27a. This is also the same with other image-pickup devices 27b to 27d.

In this manner, each image-pickup device 27a to 27d picks up the images of the image-pickup object 30 (in this case, these image-pickup devices may pick up images simultaneously or may pick up at a different timing independently), which will produce an image shown in FIG. 29(a). That is, seeing of the image-pickup device 27a, a picked-up image can be obtained that includes all the side images of the image-pickup object 30 reflected by all the mirrors of polyhedral mirror 5 within the image-pickup area 29a (FIG. 27) of the image-pickup device 27a.

Figure 23:
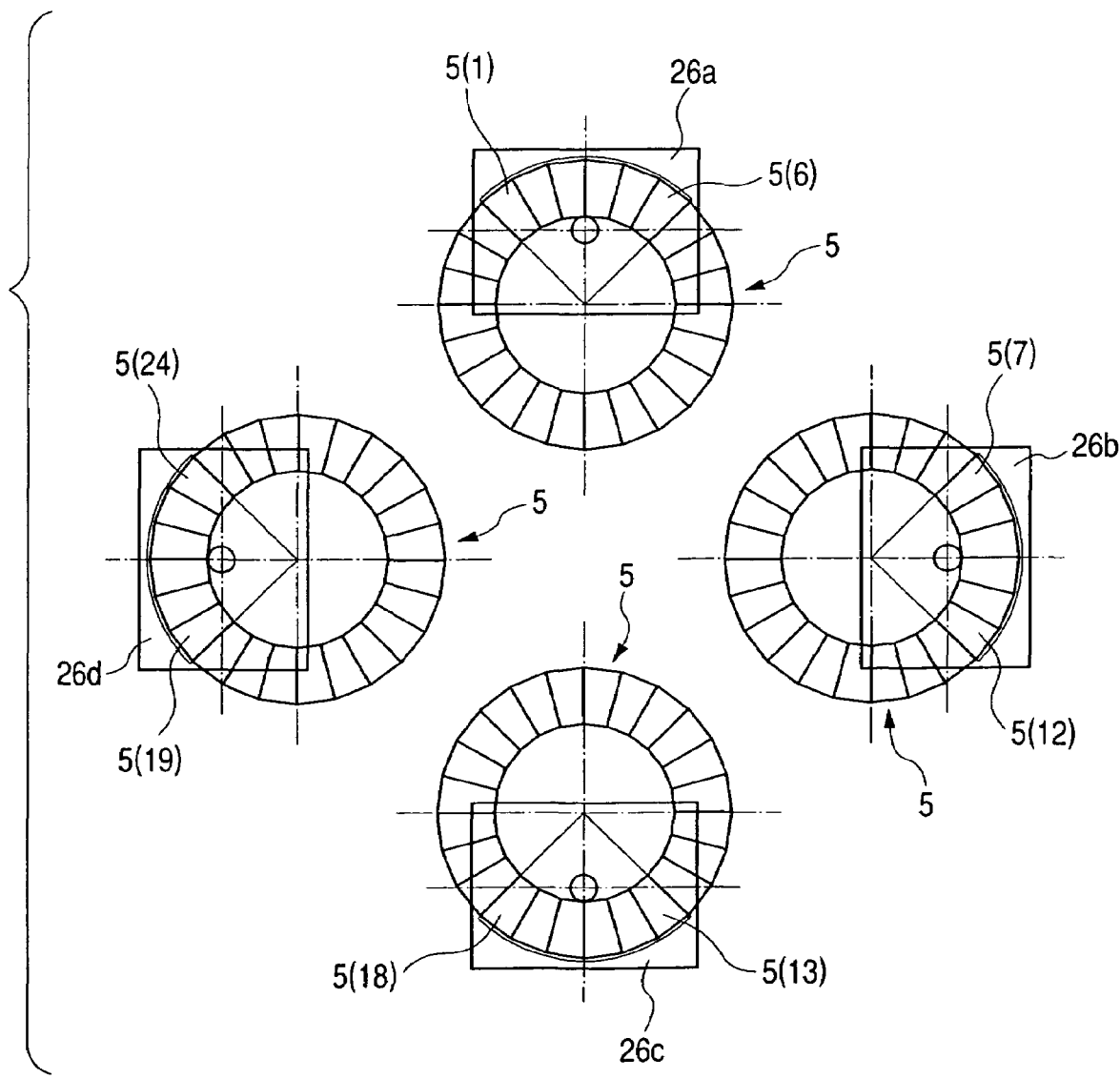
FIG. 23 is a diagram showing the image-projection areas by the individual electronic projectors in FIG. 22.

These picked-up images are processed, and as shown in FIG. 29(b), a projection image is produced wherein only necessary side images are extracted as image divisions. In this case, as shown in FIG. 23, side images from the mirror 5(1) to 5(6) in the image-projection area 26a (which is equal with image-pickup area 29a) are extracted and produced as the image divisions to be projected. This is the same also with projection images to be obtained from the other image-pickup devices 27b to 27d, and in this manner, the projection images to be projected from the individual electronic projector 1a to 1d are produced.

As for the measures to eliminate, from the picked-up images of the image-pickup devices 27a to 27d, images reflected from the unnecessary mirrors, the optical systems 28a to 28d of the image-pickup devices 27a to 27d may be provided with masks to shield image-light from such unnecessary mirrors, or the image signals outputted from the image-pickup devices 27a to 27d may be gated to eliminate the signal elements of the images from such unnecessary mirrors.

Figure 30:
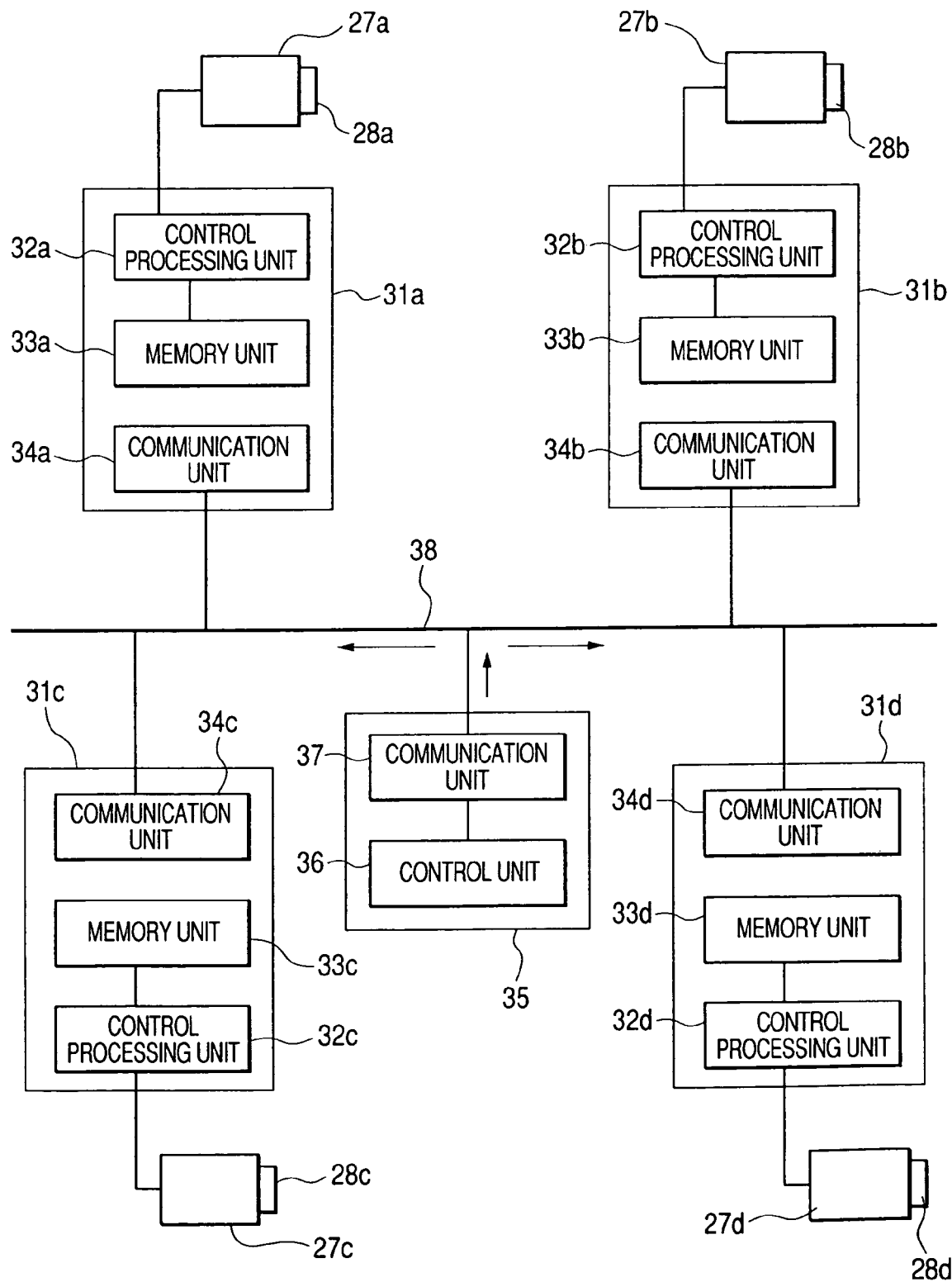
FIG. 30 is a block diagram of a system configuration for producing projection images using the image-pickup devices shown in FIG. 27 for the fifth embodiment of the display apparatus according to the present invention as shown in FIG. 22.

FIG. 30 shows a block diagram of a system configuration for producing projection images using the image-pickup devices shown in FIG. 27 for the fifth embodiment of the display apparatus according to the present invention, wherein 31a to 31d are clients, 32a to 32d are control processing units, 33a to 33d are memory units, 34a to 34d are communication units, 35 is a server, 36 is a control unit, 37 is a communication unit, 38 is a communication path, and other parts corresponding to those in FIG. 27 are marked with the same reference numerals. In this figure, each client 31a to 31d is connected to the server 35 and the communication unit 37 by its communication unit 34a to 34d through the communication path 38. Further, each client 31a to 31d comprises the control processing unit 32a to 32d and memory unit 33a to 33d respectively. Still further, the server 35 comprises the control unit 36 for generating kinds of directional signals in accordance with the operation of an operation unit not shown in the figure. For producing projection images to be projected by the individual electronic projector 1a to 1d (FIG. 22), the individual image-pickup devices 27a to 27d are connected to the control processing units 32a to 32d of the client 31a to 31d, and these image-pickup devices 27a to 27d are arranged as described in FIG. 27 respectively.

When the user of this display apparatus operates the operation unit (not shown in the figure) at the server 35 for the command to produce projection images, the control unit 36 generates command signal and send it out from the communication unit 37 on to the communication path 38. This command signal is transmitted through the communication path 38 and received by the communication units 34a to 34d of the clients 31a to 31d respectively. At the client 31a, for example, in accordance with the command signal received by the communication unit 34a, the control processing unit 32a gets the image-pickup device 27a to start picking up images. Image signals outputted from the image-pickup device 27a by picking up images are processed by the control processing unit 32a and then stored in the memory unit 33a as the image signals of the projection images to be used by the electronic projector 1*a* (FIG. 22). In this situation, at the control processing unit 32*a*, the signal elements of the images reflected by those unnecessary mirrors of the polyhedral mirror 5 (FIG. 27) may be processed for removal. In this way, the projection images to be used by the electronic projector 1*a* are memorized at the memory unit 33*a*.

This goes the same with the clients 31*b* to 31*d* and the projection images to be used by the electronic projector 1*b* to 1*d* are memorized at the memory unit 33*b*, 33*c* and 33*d*.

In addition, in the case of displaying a three-dimensional image of a still image, for the data to be memorized by the memory units 33*a* to 33*d*, one field of or one frame period of image data is sufficient, but in the case of displaying a three-dimensional image of a moving image-pickup object 30 (FIG. 27), projection images of a certain necessary period are to be stored in the memory units 33*a* to 33*d*. To summarize, the image-pickup devices 27*a* to 27*d* are started to pick up images by the start command from the server 35 initiated by the operation of the display apparatus's user, and if the user does instruction operation for a still image, one field or one frame period of image signals outputted from the image-pickup devices 27*a* to 27*d* are extracted and memorized at the memory units 33*a* to 33*d* as the projection image data for the electronic projectors 1*a* to 1*d*, and if for a moving image (record-start direction and record-end direction are sent to the memory units 33*a* to 33*d*), the picked-up image signals for the directed period of time are recorded at the memory units 33*a* to 33*d* as the projection image data.

Figure 31:
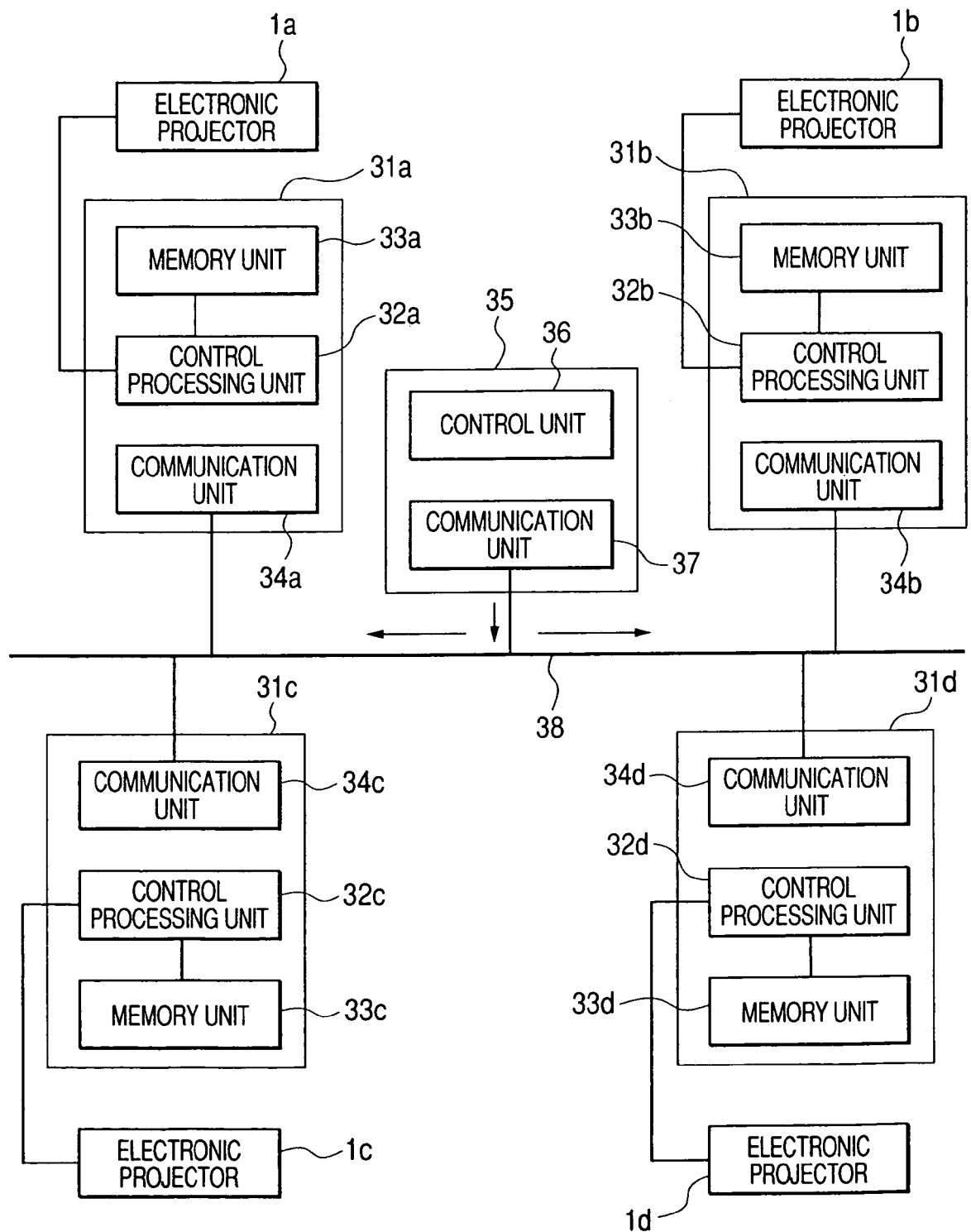
FIG. 31 is a block diagram of an example of a system configuration based on the fifth embodiment of the display apparatus according to the present invention as shown in FIG. 22.

After storing projection image data at the memory units 33*a* to 33*d* of the clients 31*a* to 31*d* respectively, for displaying an three-dimensional image using these projection images, as shown in FIG. 31, an image-pickup device 27*a* is replaced by an electronic projector 1*a* at a client 31*a*, and likewise, image-pickup devices 27*b* to 27*d* are replaced by electronic projectors 1*b* to 1*d* at clients 31*b* to 31*d* respectively, wherein these electronic projectors 1*a* to 1*d* are set as shown in FIG. 22.

With this configuration, when the user of this display apparatus operates the operation unit (not shown in the figure) at the server 35 for the direction to display projection images, the control unit 36 generates a display-direction signal and sends it out from the communication unit 37 on to the communication path 38. At the clients 31*a* to 31*d*, this display-direction signal is received by the communication units 34*a* to 34*d*, and supplied to the control processing units 32*a* to 32*d* respectively. These control processing unit 32*a* to 32*d*, receiving the display-direction signal, get the electronic projectors 1*a* to 1*d* to start and taking in the projection images from the memory units 33*a* to 33*d* send them to the electronic projectors 1*a* to 1*d*. Then the electronic projectors 1*a* to 1*d* project their projection images respectively, and as the result, a three-dimensional image is displayed by the rotating view-angle-limiting filter-attached screen 3 (FIG. 22).

Figure 32:
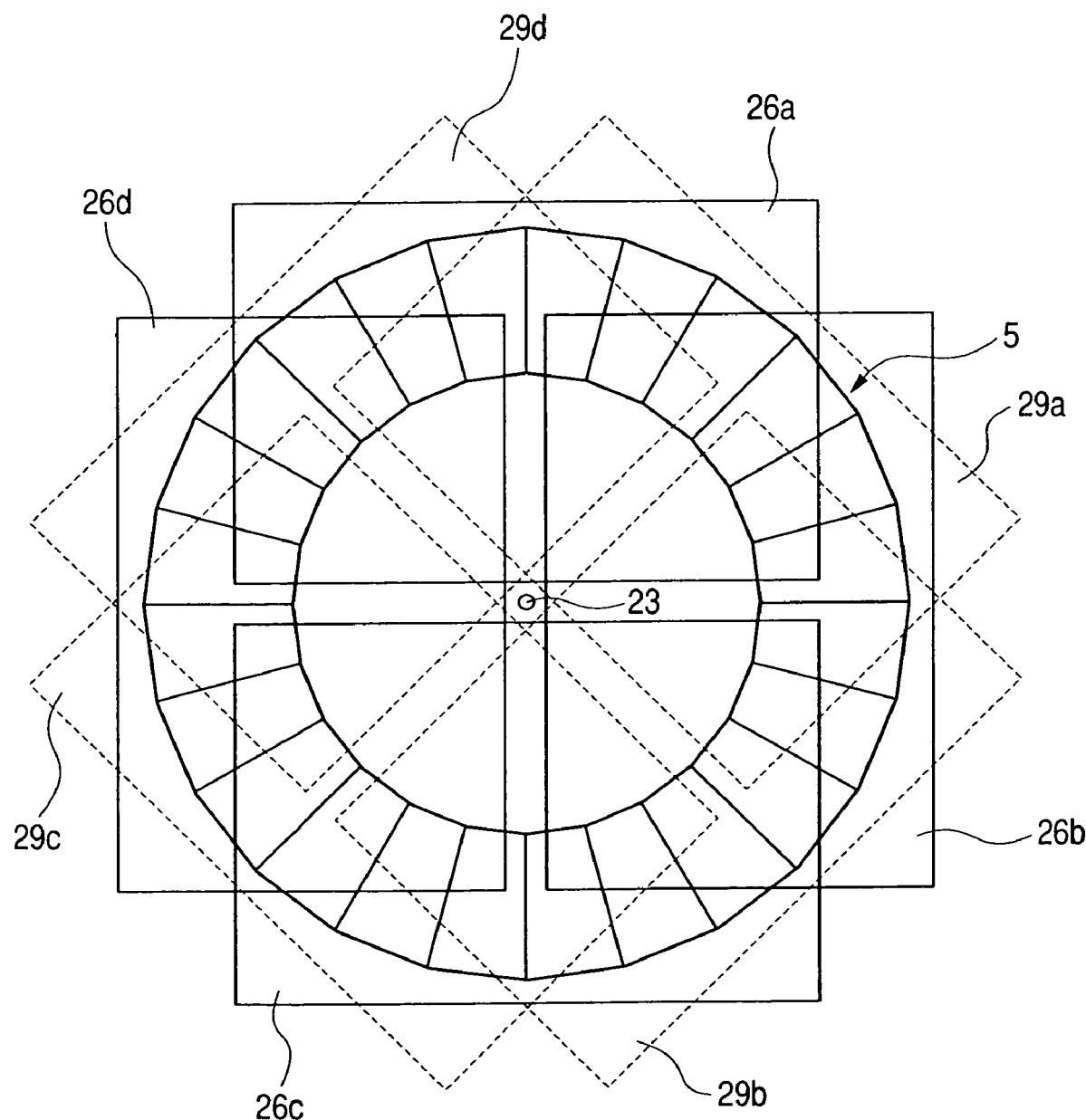
FIG. 32 is a diagram showing the relation between the image-pickup areas of the image-pickup devices and the image-projection areas of the electronic projectors in the case of a system configuration having both image-pickup devices and electronic projectors together in the fifth embodiment of the display apparatus according to the present invention as shown in FIG. 22.

In the above described system configurations, at the same clients 31*a* to 31*d*, the image-pickup devices 27*a* to 27*d* and the electronic projectors 1*a* to 1*d* are interchangeable for picking up images and for projecting the picked-up images. Now, while arranging the electronic projectors 1*a* to 1*d* as shown in FIG. 22, the image-pickup devices 27*a* to 27*d* are arranged as shown in FIG. 27 but in such a positional relation as the positions of the image-pickup devices are rotated by a certain angle around the extension axis 24, that is, in FIG. 22, an image-pickup device 27*a* is arranged between the electronic projectors 1*a* and 1*b*, an image-pickup device 27*b* is arranged between the electronic projectors 1*b* and 1*c*, an image-pickup device 27*c* is arranged between the electronic projectors 1*c* and 1*d*, and an image-pickup device 27*d* is arranged between the electronic projectors 1*d* and 1*a*, which allow omitting the work of interchanging between the image-pickup devices 27*a* to 27*d* and the electronic projectors 1*a* to 1*d*. In this case, as shown in FIG. 32, the positions of image-pickup areas 29*a* to 29*d* (shown in broken line) of the image-pickup devices 27*a* to 27*d* are to be set to be the positions where the image-projection areas 26*a* to 26*d* (shown in solid line) of the electronic projectors 1*a* to 1*d* will be when rotated around the rotary shaft 23 by an integer number of mirror plates.

Figure 33:
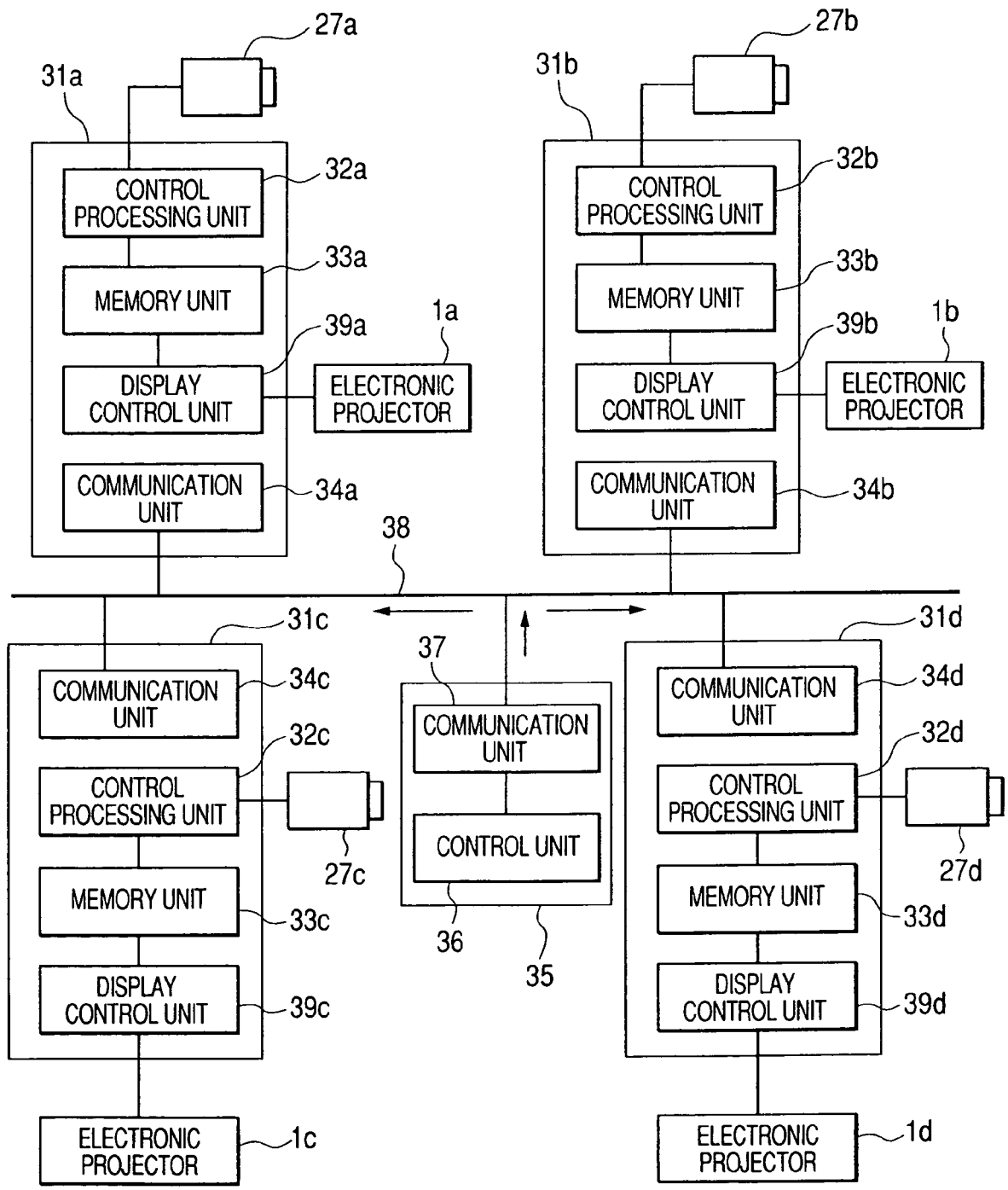
FIG. 33 is a diagram showing an example of a system configuration having both image-pickup devices and electronic projectors together in the fifth embodiment of the display apparatus according to the present invention as shown in FIG. 22.

In the above mentioned configuration as shown in FIG. 33, both an image-pickup device 27*a* and an electronic projector 1*a* for projecting projection images produced by the image-pickup device can be connected to the same client 31*a*, and likewise can be connected both an image-pickup device 27*b* and an electronic projector 1*b* for projecting projection images produced by the image-pickup device to the same client 31*b*, both an image-pickup device 27*c* and an electronic projector 1*c* for projecting projection images produced by the image-pickup device to the same client 31*c*, and both an image-pickup device 27*d* and an electronic projector 1*d* for projecting projection images produced by the image-pickup device to the same client 31*d* respectively. And at the individual clients 31*a* to 31*d*, the data of projection images obtained by the image-pickup devices 27*a* to 27*d* and stored in a memory units 33*a* to 33*d* are read out and supplied to the electronic projectors 1*a* to 1*d* under the control of display control units 39*a* to 39*d*, and projection images are projected respectively.

In this instance, a three-dimensional image displayed on the rotating view-angle-limiting filter-attached screen 3 is one rotated around the rotary shaft 23 by a certain degree as mentioned above from the original image of an image-pickup object to be picked up by the image-pickup devices 27*a* to 27*d*, which makes no relation to a viewer. A server 35 issues commands to pick up images of an image-pickup object by the image-pickup devices 27*a* to 27*d* and commands to project projection images by the electronic projector 1*a* to 1*d*.

Figure 34:
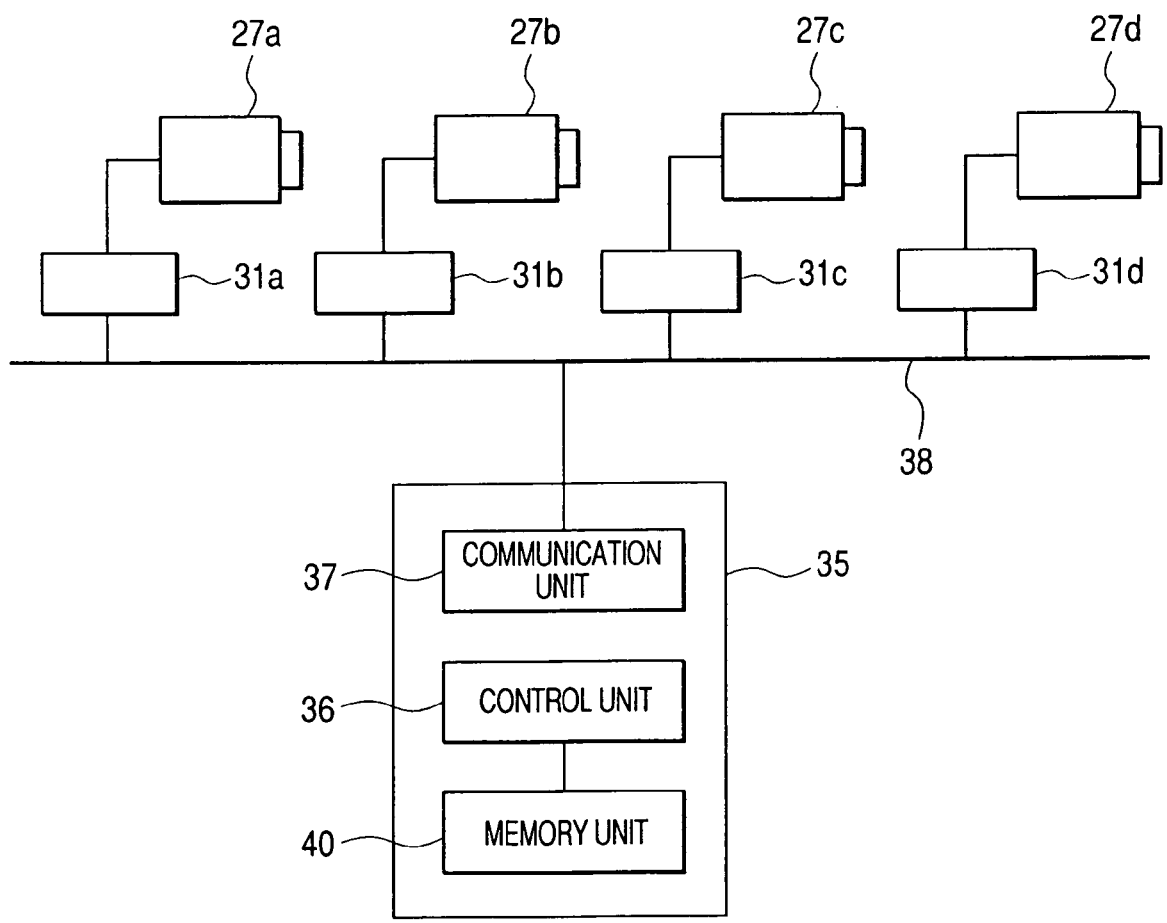
FIG. 34 is a diagram showing another example of a system configuration using the fifth embodiment of the display apparatus according to the present invention as shown in FIG. 22.

Further, while every client 31*a* to 31*d* has its own memory unit 33*a* to 33*d* in the above-described systems (FIGS. 30, 31 and 33), as shown in FIG. 34, a server 35 may have a common memory unit 40 for memorizing projection image data produced by clients 31*a* to 31*d*. For displaying a three-dimensional image, each electronic projector (not shown in FIG. 34) is supplied with corresponding projection image data read out from the memory unit 40. Incidentally, although in FIG. 34, the image-pickup device 27*a* to 27*d* can be replaced by an electronic projector in each client 31*a* to 31*d*, a configuration in which both the image-pickup device and the electronic projector are connected to each client as shown in FIG. 33 is also possible.

Figure 35A:
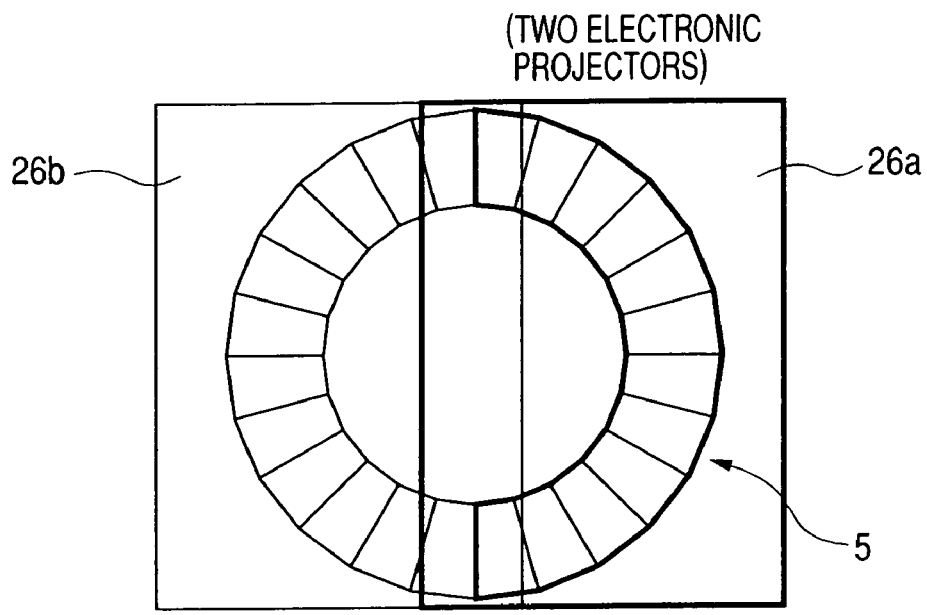
FIGS. 35(a) and 35(b) show the image-projection areas in the cases where different number of electronic projectors are used in the fifth embodiment of the display apparatus according to the present invention.
Figure 35B:
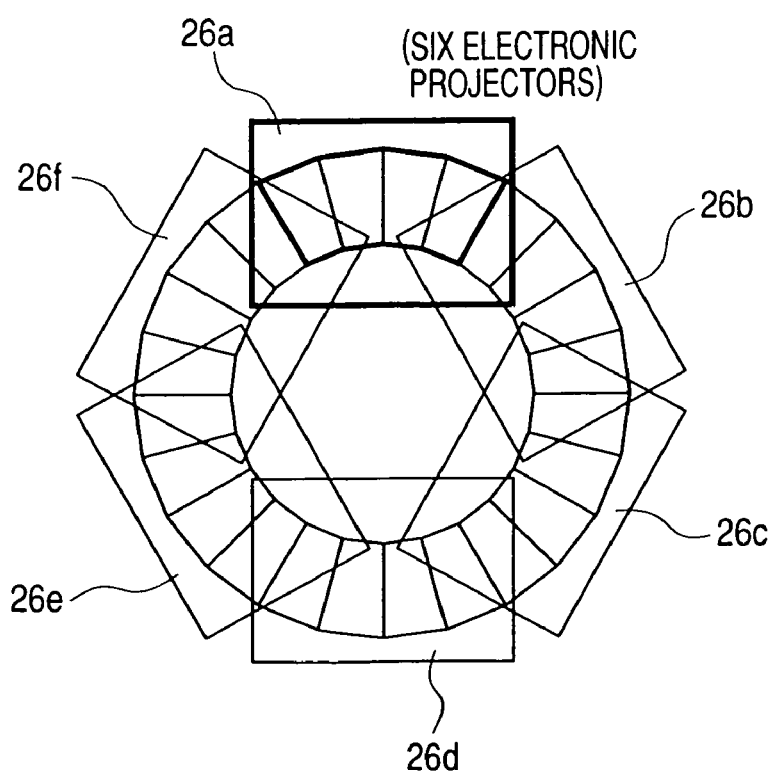
Figure 36A:
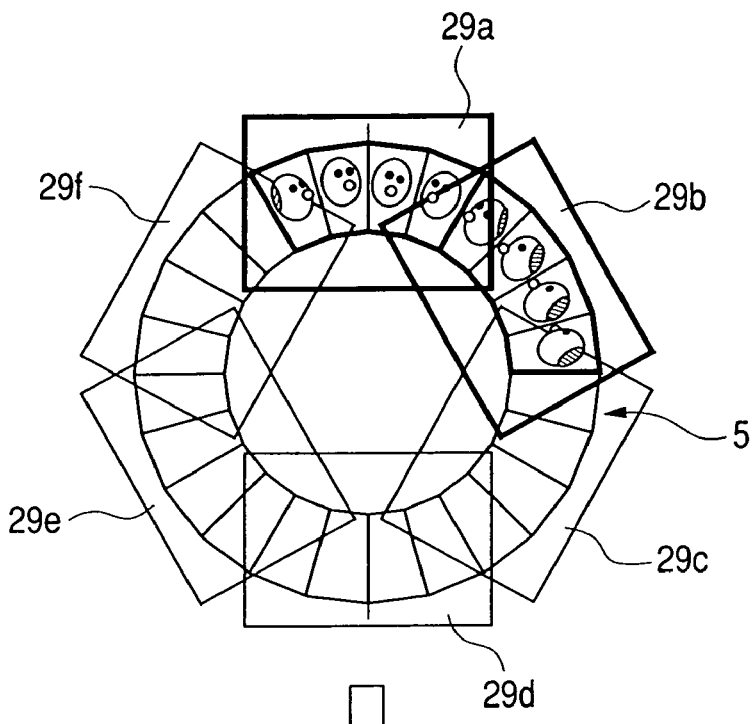
FIGS. 36(a), 36(b), 36(c) and 36(d) illustrate the production process of projection images to be used by the electronic projectors in a sixth embodiment of the display apparatus according to the present invention in which six image-pickup devices and four electronic projectors are used.
Figure 36B:
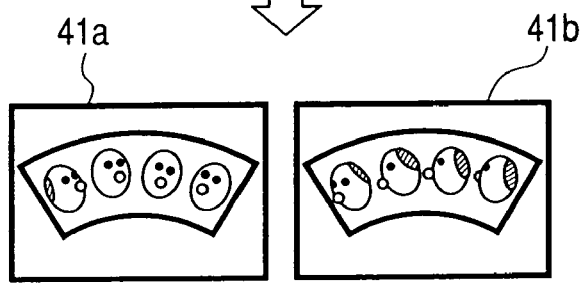
Figure 36C:
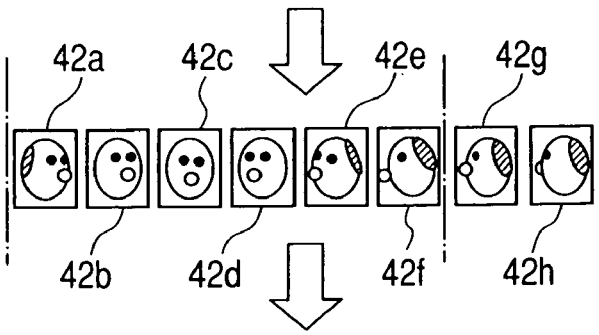
Figure 36D:
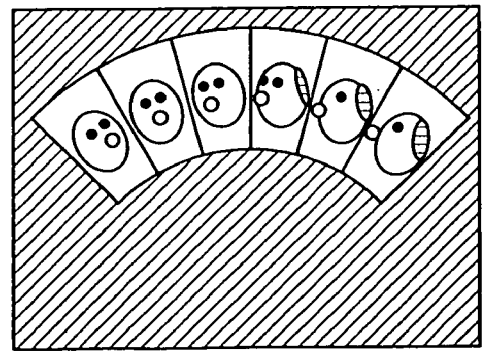

Furthermore, although four electronic projectors have been used in the configurations so far described, the number of electronic projectors is not restrictive. As far as individual electronic projectors project the same integer number of image divisions, and the electronic projectors project image divisions evenly to every mirror constituting the polyhedral mirror (that is, if the number of mirrors constituting the polyhedral mirror is "m", and the number of electronic projectors "n", m divided by n gives an integer number) any number of electronic projectors may be used. FIG. 35(*a*) shows the case where two electronic projectors are used. In this case, each electronic projector has its own image-projection area 26*a* or 26*b*, and projects image divisions to a half of the mirrors constituting a polyhedral mirror 5 (here, the polyhedral mirror 5 consisting of 24 mirrors, 12 mirrors for each electronic projector). Further, FIG. 35(*b*) shows the case where six electronic projectors are used. In this case, each electronic projector has its own image-projection area 26*a*, 26*b*, 26*c*, 26*d*, 26*e*, or 26*f*, and projects image divisions to a sixth of the mirrors constituting a polyhedral mirror 5 (here, the polyhedral mirror 5 consisting of 24 mirrors, 4 mirrors for each electronic projector).

Additionally, in above described fifth embodiment of the display apparatus according to the present invention, the polyhedral mirror 5 are used both for producing projection images by image-pickup devices 27*a* to 27*d* and for projecting projection images by the electronic projectors 1*a* to 1*d*, however, as in the second embodiment of the display apparatus shown in FIG. 13, an image-pickup apparatus for producing projection images to be used by individual electronic projectors may as well be separately prepared, the projection images produced being sent to the individual electronic projectors.

Next, the sixth embodiment of the display apparatus according to the present invention is described. In the fifth embodiment of the display apparatus described above, the number of image-pickup devices for producing projection images and the number of electronic projectors used are the same. In this sixth embodiment of the display apparatus, these numbers are different. That is, the configuration of the sixth embodiment of the display apparatus for displaying a three-dimensional image by electronic projectors is the same as the one shown in FIG. 22, and the configuration of the image-pickup apparatus for producing projection images to be used by these electronic projectors is also basically the same as the one shown in FIG. 27, but, as mentioned above, the numbers of the image-pickup devices and the electronic projectors used are different.

FIG. 36 shows the production process of projection images to be used by the electronic projectors in a display apparatus of the sixth embodiment in which six image-pickup devices are used for a image-pickup apparatus and four electronic projectors for a display apparatus.

FIG. 36(*a*) shows the image-pickup areas of a polyhedral mirror 5 by individual image-pickup devices in the case of a configuration as an image-pickup apparatus wherein the number of mirrors constituting the mirror 5 is 24. Here, the polyhedral mirror may be the polyhedral mirror 5 used for displaying a three dimensional image as shown in FIG. 22 (in this case, image-pickup devices and electronic projectors are used interchangeably), or may be the one provided for an image-pickup apparatus to be used dedicatedly for producing projection images. In this figure, the image-pickup areas for the image-pickup devices are denoted by 29*a*, 29*b*, 29*c*, 29*d*, 29*e*, and 29*f*. The image-pickup devices corresponding to these image-pickup areas 29*a*, 29*b*, - - - , 29*f* are referred to as 27*a*, 27*b*, - - - , 29*f*. And four electronic projectors used in the configuration as a display apparatus are referred to as 1*a*, 1*b*, 1*c* and 1*d*.

As shown in FIG. 36(*a*), the image-pickup area 29*a* for the image-pickup device 27*a* is set to an area that fully includes four mirrors of the polyhedral mirror 5 in the same manner as in the fifth embodiment, and the image-pickup area 29*b* for the next image-pickup device 27*b* is set to an area that includes fully the next four mirrors. Likewise, the individual image-pickup areas 29*c*, 29*d*, 29*e*, 29*f* are set to the areas that sequentially fully include the next four mirrors respectively (in this instance, each image-pickup area 29*a* to 29*f* is preferably filled with the four mirrors as much as possible).

With this setup, as shown in FIG. 36(*b*), a picked-up image 41*a* including four perfect image divisions is obtained from the image-pickup device 27*a*, and a picked-up image 41*b* including the next four perfect image divisions is obtained from the image-pickup device 27*b*. Likewise, though not shown in the figure, from each of the image-pickup devices 27*c*, 27*d*, 27*e*, 27*f* can be obtained a picked-up image including four perfect image divisions respectively, these image divisions representing images of an image-pickup object (not shown) as viewed form different directions.

Out of the picked-up images 41*a* and 41*b* obtained in a manner described above, image divisions are extracted as shown in FIG. 36(*c*). Coding these image divisions as 42*a*, 42*b*, 42*c*, 42*d*, 42*e*, 42*f*, 42*g*, and 42*h*, out of these image divisions six image divisions 42*a*, 42*b*, 42*c*, 42*d*, 42*e*, 42*f* are sequentially selected, and as shown in FIG. 36(*d*), a group of images arranged in a circular arc is produced. This will make a projection image to be used by one of the electronic projectors, i.e. the electronic projector 1*a*.

Further, out of the picked-up images obtained by the image-pickup device 27*c* picking up images of the image-pickup area 29*c*, four image divisions are extracted, and being combined with 42*g* and 42*h* (FIG. 36(*c*)) that are the rest of the image divisions extracted from the picked-up image 41*b* taken by the image-pickup device 27*b*, produced into a group of images arranged in a circular arc. This will make a projection image to be used by the electronic projector 1*b*. In this manner, projection images for two electronic projectors 1*a* and 1*b* are obtained from the picked-up images picked up by three image-pickup devices 27*a* to 27*c*. Likewise, from four image divisions obtained by picking up images of the image-pickup area 29*d* and two image divisions obtained by picking up images of the image-pickup area 29*e*, a projection image to be used by the electronic projector 1*c* is produced, and from the remaining two image divisions obtained by picking up the image-pickup area 29*e* and four image divisions obtained by picking up the image-pickup area 29*f*, a projection image to be used by the electronic projector 1*d* is produced.

In this case of using six image-pickup devices to produce projection images to be used by four electronic projectors, as compared with the case of using the same number of image-pickup devices as electronic projectors, the size of the image division in a picked-up image by each image-pickup device can be larger, resulting in a higher resolution of each image division. Therefore, in the case of using six image-pickup devices, compared with the case of using the same number of image-pickup devices as electronic projectors, a three-dimensional image of improved high resolution can be obtained, and to obtain a three-dimensional image of the same level of resolution as in the case of using the same number of image-pickup devices as electronic projectors, image-pickup devices of lower level of resolution may be used than in the case of using the same number of image-pickup devices as electronic projectors, allowing to use less expensive image-pickup devices of lower resolution. This point holds true not only to the above example of the number of image-pickup devices and electronic projectors but to any cases where the number of image-pickup devices used is larger than that of electronic projectors used.

FIG. 37 illustrates the process of producing projection images to be used by the electronic projectors in a display apparatus of the sixth embodiment of the present invention, where, when it is used as an image-pickup apparatus, one image-pickup device is used, and when it is used as a display apparatus, four electronic projectors are used.

FIG. 37(*a*) shows the image-pickup areas of a polyhedral mirror 5 by an image-pickup device wherein the number of mirrors constituting the mirror 5 is 24. In this case also, the polyhedral mirror may be the polyhedral mirror 5 used for displaying a three dimensional image as shown in FIG. 22 (in this case, image-pickup devices and electronic projectors may be used interchangeably, or the image-pickup device may be set in the center of the layout of the four electronic projectors (on the extensional axle 24 in FIG. 22)), or may be the one provided for an image-pickup apparatus to be used dedicatedly for producing projection images. In this figure, the image-pickup area for the image-pickup device is numbered 29. The image-pickup device for the image-pickup areas 29 is referred to as 27, and four electronic projectors used are referred to as 1a, 1b, 1c and 1d.

Figure 37A:
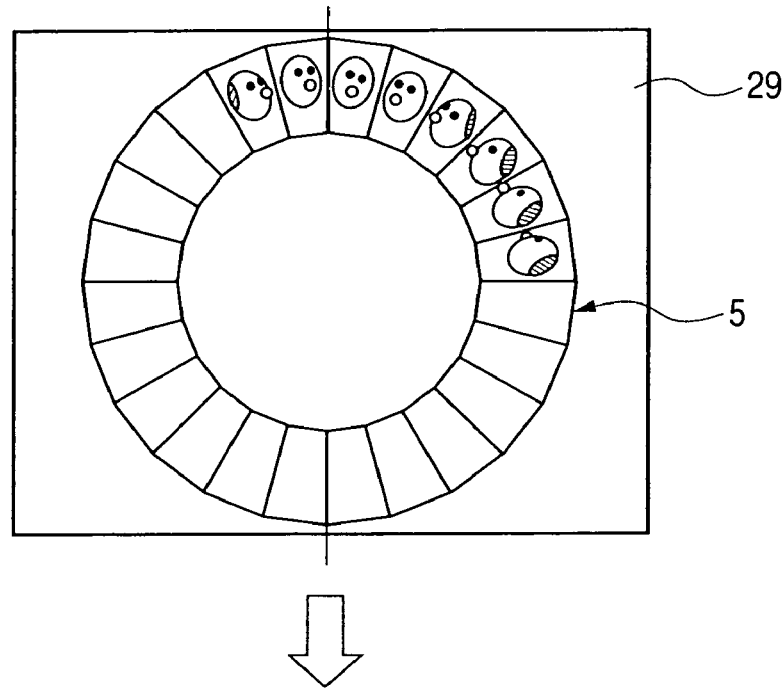
FIGS. 37(a), 37(b) and 37(c) illustrate the production process of projection images to be used by the electronic projectors in a sixth embodiment of the display apparatus according to the present invention in which one image-pickup device and four electronic projectors are used.

As shown in FIG. 37(a), the image-pickup area 29 for the image-pickup device 27 fully includes the whole polyhedral mirror 5 (preferably the mirror filling the image-pickup area 29 as much as possible). Therefore, the picked-up image obtained by the image-pickup device 27 will include the whole image divisions arrayed in a ring form.

Figure 37B:
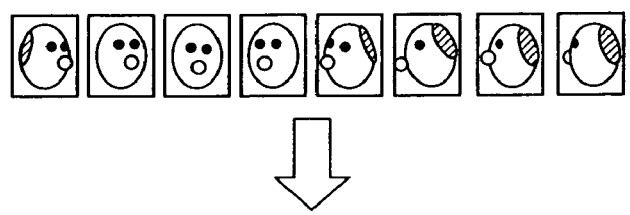
Figure 37C:
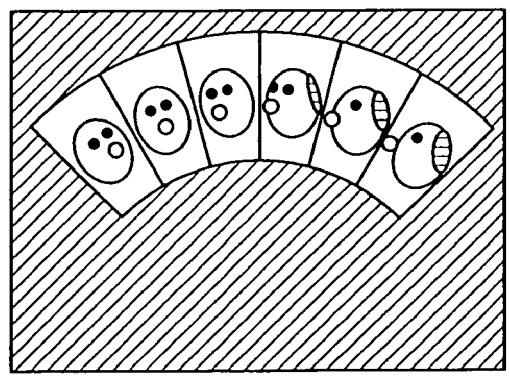

Image divisions are extracted (FIG. 37(b)) out of the picked-up images obtained in a manner described above, and, in the order of the alignment, grouped into the number of the electronic projectors (that is, divided into four groups, each having 6 image divisions: 24÷4=6), and by each such group, a projection image is produced with 6 image divisions arranged in a circular arc as shown in FIG. 37(c) in accordance with the alignment of the mirrors in the polyhedral mirror 5. In this manner the projection image to be used by each electronic projector 1a to 1d is produced.

As described above, in the case of using one image-pickup device 29, compared with the case of using a plurality of image-pickup devices as illustrated in FIG. 36, an image division of a picked-up image will be smaller resulting in lower resolution of the image division. However, if the image-pickup device 29 is one of high resolution, an image division obtained would also be of such an resolution as would allow to obtain a three-dimensional image of high resolution. This can be said also in the case of using a plurality of image-pickup devices, that is, if image-pickup devices of high resolution are used, the number of image-pickup devices used may be smaller than the number of electronic projectors.

FIG. 38 is a drawing conceptually illustrating another embodiment of an image-pickup apparatus for producing projection images for a display apparatus according to the sixth embodiment of the present invention.

In this embodiment, as shown in FIG. 38(a), a plurality of image-pickup devices 27 are arranged around an image-pickup object 30, individual image-pickup devices picking up a side-image of the image-pickup object 30 from different directions. Here, the number of the image-pickup devices 27 is the same number as that of the image divisions used by electronic projectors for displaying a three-dimensional image, that is, the number of mirrors constituting the polyhedral mirror. Therefore, if the polyhedral mirror comprises 24 mirrors, 24 image-pickup devices are used arranged evenly spaced around the image-pickup object 30, each directing to a point on the image-pickup object 30. These individual image-pickup devices 27 are corresponding to mirrors constituting the polyhedral mirror respectively and pick up side-images of the same image-pickup object 30 from different directions directly and simultaneously. This is how the image-pickup devices 27 pick up images from which image divisions to be projected to corresponding mirrors of the polyhedral mirror are produced.

The image divisions to be used for displaying a three-dimensional image, as illustrated by FIG. 38(b), are extracted from the picked-up images of the individual image-pickup devices 27, and in accordance with the order of alignment of the image-pickup devices for picking up images of the image-pickup object 30, which is to give an alignment of the image divisions as shown in FIG. 37(a), the image divisions are distributed in this alignment order to individual electronic projectors to be used for displaying an three-dimensional image. For example, if the polyhedral mirror comprises of 24 mirrors, the number of image-pickup devices is 24 (producing 24 image divisions), and if 4 electronic projectors are used, the image divisions obtained are divided into groups each of which having 6 image divisions, and these 6 image divisions of each group are assigned to the individual electronic projectors sequentially.

Six image divisions assigned in this manner are arranged in a circular arc in accordance with the arrangement of the mirrors in the polyhedral mirror, and a projection image of image divisions in this arrangement is produced.

As described above, this embodiment of image-pickup apparatus according to the present invention, since the image-pickup devices pick up images of the image-pickup object directly without using a polyhedral mirror, can accommodate a larger image-pickup object 30, giving a lot of flexibility, and allows to obtain image divisions of high resolution and display a three-dimensional image of high resolution.

As described so far, the sixth embodiment of the display apparatus according to the present invention, compared with the fifth embodiment of the display apparatus explained with reference to FIG. 22 to FIG. 35, enables obtaining a three-dimensional image of much higher resolution, and reducing the number of image-pickup devices.

Incidentally, while, with the fifth or sixth embodiment of the display apparatus according to the present invention, projection images to be projected from electronic projectors are produced from the picked-up images obtained from the image-pickup devices of an image-pickup apparatus, they can also be produced by computer-graphics and the like. FIG. 39 is a flowchart for the production process of projection images depending on the resources of the projection images.

Referring to the figure, receiving a request of an image output from a user of the display apparatus (step 100), it is determined whether the resource of the image is a camera (an image-pickup device) or not (step 101). Now presuming picked-up images by camera are going to be used, connection with a camera is secured (started) (step 102), and picked-up images are obtained (step 103). Then the number of mirrors (sheets) of the polyhedral mirror which each camera takes charge of (that is, to pick up images for image divisions) is calculated for each camera (step 104), and the image divisions are cut out from the image reflected in each mirror of such number of mirrors (step 105). Then, the number of mirrors (sheets) of the polyhedral mirror which each electronic projector takes charge is calculated for every electronic projector (step 108), and projection images arranged image divisions corresponding to each mirror in consideration of the position and inclination (posture) of each mirror which each electronic projector take charge, are produced for each mirror (step 109). And then, the produced projection images are sent to the corresponding electronic projectors to be projected (step 110). Thus, a three-dimensional image is displayed on the aforementioned view-angle-limiting filter-attached screen.

And if the resource is computer graphics or the like other than a camera (step 101), the resource of the image is selected and set up (step 106), then the image divisions are taken in from the resource (step 107). And then by processing the taken-in image divisions in accordance with the step 108 and 109, projection images for individual electronic projectors are produced and projected, displaying a three-dimensional image e.g. an animated cartoon, etc. (step 110).

What is claimed is:

1. A display apparatus, comprising:
   a screen;
   a rotary mechanism which rotates the screen;
   an electronic projector which radiates image;
   a projection mirror group of plural mirrors arranged in cylindrical state so as to surround the screen and a rotary axis of the rotary mechanism; and
   an overhead mirror mounted to a plane substantially perpendicular to an extension of the rotary axis of the rotary mechanism;
   wherein the image radiated from the electronic projector projects to the screen via the projection mirror group and the overhead mirror.

2. The display apparatus according to claim 1 wherein said projected image includes mutually different plural images associated with plural directions to which the screen is faced, and the different plural images are projected via the plural mirrors of the projection mirror group to the screen so as to form a three-dimensional image.

3. The display apparatus according to claim 1 wherein said screen is a directional reflection screen.

4. The display apparatus according to claim 1 wherein said screen is a semi-permeable screen.

5. The display apparatus according to claim 4 wherein said projection mirror group comprises the plural mirrors arranged with partial directions in the cylindrical state.

6. The display apparatus according to claim 5 wherein said plural mirrors are arranged with semi-cylindrical directions in the cylindrical state.

* * * * *